(12) United States Patent
Iwase et al.

(10) Patent No.: US 7,935,022 B2
(45) Date of Patent: May 3, 2011

(54) CONTROL APPARATUS FOR HYBRID VEHICLE POWER TRANSMITTING SYSTEM

(75) Inventors: Yuji Iwase, Mishima (JP); Tooru Matsubara, Toyota (JP); Hiroyuki Shibata, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 539 days.

(21) Appl. No.: 12/153,697

(22) Filed: May 22, 2008

(65) Prior Publication Data

US 2009/0023530 A1   Jan. 22, 2009

(30) Foreign Application Priority Data

May 24, 2007   (JP) ................................ 2007-138355

(51) Int. Cl.
  *B60W 10/02*  (2006.01)
  *B60W 10/06*  (2006.01)
  *B60W 10/08*  (2006.01)
(52) U.S. Cl. .............................. 477/5; 477/175; 903/946
(58) Field of Classification Search .................. 903/930
   See application file for complete search history.

(56) References Cited

U.S. PATENT DOCUMENTS

| | | | |
|---|---|---|---|
| 2007/0087893 A1* | 4/2007 | Tabata et al. | 477/3 |
| 2007/0105679 A1* | 5/2007 | Tabata et al. | 475/5 |

FOREIGN PATENT DOCUMENTS

| | | |
|---|---|---|
| JP | A-09-308010 | 11/1997 |
| JP | A-09-327104 | 12/1997 |
| JP | A-10-339333 | 12/1998 |
| JP | A-2002-327843 | 11/2002 |
| JP | A-2003-193878 | 7/2003 |

* cited by examiner

*Primary Examiner* — Edwin A Young
(74) *Attorney, Agent, or Firm* — Oliff & Berridge, PLC

(57) ABSTRACT

A control apparatus for a hybrid vehicle power transmitting system including a switching portion operable to switch a power transmitting path between a power transmitting state and a power cut-off state in response to an operation of a shift lever, the control apparatus including (a) an operating-state estimating portion configured to estimate an operating speed of an electric motor which constitutes a part of the power transmitting path or a rotating speed of a coupling element of the coupling portion, which speed is established after switching of the power transmitting path from one of the power transmitting and cut-off states to the other, and (b) a switching restricting portion configured to restrict a switching operation to switch the power transmitting path between the two states, when the estimated operating or rotating speed of the electric motor or coupling device is higher than a predetermined upper limit.

23 Claims, 14 Drawing Sheets

| | C1 | C2 | B1 | B2 | B3 | SPEED RATIO | STEPPING RATIO |
|---|---|---|---|---|---|---|---|
| 1st | ○ | | | | ○ | 3.357 | 1.54 |
| 2nd | ○ | | | ○ | | 2.180 | 1.53 |
| 3rd | ○ | | ○ | | | 1.424 | 1.42 |
| 4th | ○ | ○ | | | | 1.000 | SPREAD 3.36 |
| R | | ○ | | | ○ | 3.209 | |
| N | | | | | | | |

○ ENGAGED

CONTROL APPARATUS FOR HYBRID VEHICLE POWER TRANSMITTING SYSTEM

CROSS REFERENCE TO RELATED APPLICATION

The present application claims priority from Japanese Patent Application No. 2007-138355, which was filed on May 24, 2007, the disclosure of which is herein incorporated by reference in its entirety.

BACKGROUND OF THE INVENTION

1. Field of the Invention

The present invention relates in general to a control apparatus for a hybrid vehicle power transmitting system, and more particularly to techniques for reducing a risk of an excessive rise of operating speeds of electric motors and a clutch provided in the power transmitting system.

2. Discussion of Prior Art

There is known a control apparatus for a power transmitting system of a hybrid vehicle provided with an engine, an electric generator and a vehicle drive electric motor, which control apparatus is arranged to reduce a torque of the engine for reducing a risk of an excessive rise of the operating speed of the vehicle drive electric motor, when the operating speed of the vehicle drive electric motor exceeds a threshold value due to slipping of drive wheels of the hybrid vehicle. JP-2003-193878A discloses an example of such a hybrid vehicle control apparatus. The hybrid vehicle control apparatus disclosed in this publication limits the operating speed of the vehicle drive electric motor, for reducing an adverse influence of the excessive rise of the operating speed of the vehicle drive electric motor on the durability of the hybrid vehicle power transmitting system.

The above-identified publication does not refer to a transmission which constitutes a part of the power transmitting system and which is arranged to switch a power transmitting path between a power transmitting state and a power cut-off state. Hence, the control apparatus disclosed in the publication is not configured to suitably control a switching portion of the power transmitting system provided to switch the power transmitting path between the power transmitting state and the power cut-off state, for reducing the risk of the excessive rise of the operating speed of the vehicle drive electric motor.

SUMMARY OF THE INVENTION

The present invention was made in view of the background art described above. It is therefore an object of this invention to provide a control apparatus for a hybrid vehicle power transmitting system, which control apparatus is configured to reduce or eliminate a risk of an excessive rise of the operating speed of electric motors, etc. by suitably restricting the switching of the power transmitting path between the power transmitting state and the power cut-off state.

The object indicated above can be achieved according to any one of the following modes of this invention, each of which is numbered like the appended claims and which depends from the other mode or modes, where appropriate, for easier understanding of technical features disclosed in the present application, and combinations of those features.

(1) A control apparatus for a hybrid vehicle power transmitting system including (a) an electrically controlled differential portion which has a differential mechanism and an electric motor operatively connected to the differential mechanism and a differential state of which is controllable by controlling an operating state of the electric motor, and (b) a switching portion which constitutes a part of a power transmitting path and which is operable to switch the power transmitting state between a power transmitting path and a power cut-off state, the control apparatus comprising:

an operating-state estimating portion configured to estimate the operating state of the electric motor after the power transmitting path is switched from the power cut-off state to the power transmitting state; and a switching restricting portion configured to restrict a switching operation to switch the power transmitting path from the power cut-off state to the power transmitting state, when the operating state of the electric motor estimated by the operating-state estimating portion is in a predetermined state.

In the control apparatus of the above-described mode (1) according to a first aspect of the present invention, the switching operation to switch the power transmitting path from the power cut-off state to the power transmitting state is restricted when the operating state of the electric motor estimated by the operating-state estimating portion is in the predetermined state. Accordingly, a risk of an excessive rise of the operating speed of the electric motor due to the switching of the power transmitting path can be reduced at an earlier point of time than when the switching operation is not restricted.

(2) The control apparatus according to the above-described mode (1), wherein the operating state of the electric motor includes an operating speed of the electric motor, and the switching restricting portion restricts the switching operation when an absolute value of the operating speed of the electric motor is higher than a predetermined upper limit.

In the above-described mode (2) of the invention, the switching operation of the power transmitting path is restricted when the absolute value of the estimated operating speed of the electric motor is higher than the predetermined upper limit, so that the risk of a rise of the operating speed of the electric motor beyond the upper limit can be reduced at an earlier point of time than when the switching operation is not restricted.

(3) The control apparatus according to the above-described mode (1) or (2), further comprising a speed reducing portion configured to reduce an operating speed of the electric motor when the operating state of the electric motor estimated by the operating-state estimating portion is in the predetermined state.

In the above-described mode (3) of this invention, the operating speed of the electric motor is reduced when the estimated operating state of the electric motor is in the predetermined state. Accordingly, an excessive rise of the operating speed of the electric motor due to the switching of the power transmitting path can be prevented.

(4) The control apparatus according to any one of the above-described modes (1)-(3), wherein the electrically controlled differential portion includes an output shaft from which an output of the differential portion is transmitted to a drive wheel of a hybrid vehicle provided with the vehicular power transmitting system, and the switching restricting portion is operated to restrict the switching operation when it is estimated that a direction of rotation of the output shaft is reversed when the power transmitting path is switched from the power cut-off state to the power transmitting state.

In the above-described mode (4), the switching operation to switch the power transmitting path from the power cut-off state to the power transmitting state is restricted if it is estimated that the direction of rotation of the output shaft of the electrically controlled differential portion from which the output is transmitted to the vehicle drive wheel is reversed when the power transmitting path is switched from the power cut-off state to the power transmitting state. Thus, the switching operation is suitably restricted when there is a relatively high risk of an excessive rise of the operating speed of the electric motor.

(5) The control apparatus according to any one of the above-described modes (1)-(4), wherein the electrically controlled differential portion is operable as a continuously-variable transmission mechanism while the operating state of the electric motor is controlled.

In the above-described mode (5) of the present invention wherein the electrically controlled differential portion is operable as the continuously-variable transmission mechanism while the operating state of the electric motor is controlled, the output torque of the differential portion can be smoothly changed. The electrically controlled differential portion which is operable as the continuously-variable transmission mechanism the speed ratio of which is continuously variable is also operable as a step-variable transmission the speed ratio of which is variable in steps.

(6) The control apparatus according to any one of the above-described modes (1)-(5), wherein the vehicular power transmitting system includes a hydraulic switching valve operable to cut off a hydraulic pressure to switch the power transmitting path in response to an operation of a shift lever by an operator of a hybrid vehicle provided with the vehicular power transmitting system, and the switching restricting portion is configured to restrict an operation of the hydraulic switching valve in response to the operation of the shift lever.

(7) The control apparatus according to any one of the above-described modes (1)-(6), wherein the vehicular power transmitting system is provided to transmit an output of an internal combustion engine to a drive wheel of a hybrid vehicle provided with the vehicular power transmitting system, and the switching restricting portion is configured to reduce an operating speed and an output torque of the internal combustion engine, for reducing a rise of the operating speed of the electric motor.

(8) The control apparatus according to any one of the above-described modes (1)-(7), wherein the electrically controlled differential portion includes a differential limiting device operable to limit a differential function of the differential mechanism, and the switching restricting portion is configured to reduce a rise of the operating speed of the electric motor, by commanding the differential limiting device to limit the differential function of the differential mechanism.

(9) A control apparatus for a hybrid vehicle power transmitting system including (a) a switching portion which constitutes a part of a power transmitting path between a drive power source and drive wheels of a hybrid vehicle and which is operable to switch the power transmitting path between a power transmitting state and a power cut-off state, and (b) an electric motor operatively connected to the power transmitting path, the control apparatus comprising]

an operating-state estimating portion configured to estimate an operating state of the electric motor after the power transmitting path is switched from the power transmitting state to the power cut-off state; and a switching restricting portion configured to restrict a switching operation to switch the power transmitting path from the power transmitting state to the power cut-off state, when the operating state of the electric motor estimated by the operating-state estimating portion is in a predetermined state.

In the control apparatus of the above-described mode (9) according to a second aspect of the present invention, the switching operation to switch the power transmitting path from the power transmitting state to the power cut-off state is restricted when the operating state of the electric motor estimated by the operating-state estimating portion is in the predetermined state. Accordingly, a risk of an excessive rise of the operating speed of the electric motor due to the switching of the power transmitting path can be reduced at an earlier point of time than when the switching operation is not restricted.

(10) The control apparatus according to the above-described mode (9), wherein the operating state of the electric motor includes an operating speed of the electric motor, and the switching restricting portion restricts the switching operation when an absolute value of the operating speed of the electric motor is higher than a predetermined upper limit.

In the above-described mode (10), the switching operation of the power transmitting path is restricted when the absolute value of the estimated operating speed of the electric motor is higher than the predetermined upper limit, so that the risk of a rise of the operating speed of the electric motor beyond the upper limit can be reduced at an earlier point of time than when the switching operation is not restricted.

(11) The control apparatus according to the above-described mode (9) or (10), further comprising a speed reducing portion configured to reduce an operating speed of the electric motor when the operating state of the electric motor estimated by the operating-state estimating portion is in the predetermined state.

In the above-described mode (11) of the invention, the operating speed of the electric motor is reduced when the estimated operating state of the electric motor is in the predetermined state. Accordingly, an excessive rise of the operating speed of the electric motor due to the switching of the power transmitting path can be prevented.

(12) The control apparatus according to any one of the above-described modes (9)-(11), wherein the hybrid vehicle power transmitting system further includes (c) an electrically controlled differential portion which has a differential mechanism and another electric motor operatively connected to the differential mechanism and a differential state of which is controllable by controlling the operating state of the above-indicated another electric motor.

In the above-described mode (12) wherein the power transmitting system includes the electrically controlled differential portion, an output torque of the differential portion to be transmitted to a drive wheel of the hybrid vehicle can be changed depending upon the operating state of the electric motor of the differential portion.

(13) The control apparatus according to the above-described mode (12), wherein the electrically controlled differential portion is operable as a continuously-variable transmission mechanism while the operating state of the electric motor is controlled.

The above-described mode (13) has the same advantage as described above with respect to the above-described mode (5).

(14) The control apparatus according to any one of the above-described modes (9)-(13), wherein the vehicular power transmitting system includes a hydraulic switching valve operable to cut off a hydraulic pressure to switch the power transmitting path in response to an operation of a shift lever by an operator of a hybrid vehicle provided with the vehicular power transmitting system, and the switching restricting portion is configured to restrict an operation of the hydraulic switching valve in response to the operation of the shift lever.

(15) The control apparatus according to any one of the above-described modes (9)-(14), wherein the vehicular power transmitting system is provided to transmit an output of an internal combustion engine provided as the drive power source to the drive wheels, and the switching restricting portion is configured to reduce an operating speed and an output torque of the internal combustion engine, for reducing a rise of the operating speed of the second electric motor.

(16) The control apparatus according to the above-described mode (12), wherein the electrically controlled differential portion includes a differential limiting device operable to limit a differential function of the differential mechanism, and the switching restricting portion is configured to reduce a rise of the operating speed of the electric motor, by commanding the differential limiting device to limit the differential function of the differential mechanism.

(17) A control apparatus for a hybrid vehicle power transmitting system including (a) an electrically controlled differential portion which has a differential mechanism and an electric motor operatively connected to the differential mechanism and a differential state of which is controllable by controlling an operating state of the electric motor, and (b) a switching portion which constitutes a part of a power transmitting path and includes a coupling element operable to switch the power transmitting path between a power transmitting state and a power cut-off state, the control apparatus comprising:

an operating-state estimating portion configured to estimate the operating state of the coupling element after the power transmitting path is switched from the power transmitting state to the power cut-off state; and a switching restricting portion configured to restrict a switching operation to switch the power transmitting path from the power transmitting state to the power cut-off state, when the operating state of the element estimated by the operating-state estimating portion is in a predetermined state.

In the control apparatus of the above-described mode (17) according to a third aspect of the present invention, the switching operation to switch the power transmitting path from the power transmitting state to the power cut-off state is restricted when the operating state of the coupling element estimated by the operating-state estimating portion is in the predetermined state. Accordingly, a risk of an excessive rise of the rotating speed of the coupling element due to the switching of the power transmitting path can be reduced at an earlier point of time than when the switching operation is not restricted.

(18) The control apparatus according to the above-described mode (17), wherein the operating state of the coupling element includes a rotating speed of the coupling element, and the switching restricting portion restricts the switching operation when an absolute value of the rotating speed of the coupling element is higher than a predetermined upper limit.

In the above-described mode (18), the switching operation of the power transmitting path is restricted when the absolute value of the estimated rotating speed of the coupling element is higher than the predetermined upper limit, so that the risk of a rise of the rotating speed of the coupling element beyond the upper limit can be reduced at an earlier point of time than when the switching operation is not restricted.

(19) The control apparatus according to the above-described mode (17) or (18), wherein further comprising a speed reducing portion configured to reduce a rotating speed of the coupling element when the operating state of the coupling element estimated by the operating-state estimating portion is in the predetermined state.

In the above-described mode (19), the operating speed of the coupling element is reduced when the estimated operating state of the coupling element is in the predetermined state. Accordingly, an excessive rise of the rotating speed of the coupling element due to the switching of the power transmitting path can be prevented.

(20) The control apparatus according to any one of the above described modes (17)-(19), wherein the electrically controlled differential portion is operable as a continuously-variable transmission mechanism while the operating state of the electric motor is controlled.

The above-described mode (20) has the same advantage as described above with respect to the above described mode (5).

(21) The control apparatus according to any one of the above-descried modes (17)-(20), wherein the vehicular power transmitting system includes a hydraulic switching valve operable to cut off a hydraulic pressure to switch the power transmitting path in response to an operation of a shift lever by an operator of a hybrid vehicle provided with the vehicular power transmitting system, and the switching restricting portion is configured to restrict an operation of the hydraulic switching valve in response to the operation of the shift lever.

(22) The control apparatus according to any one of the above-described modes (17)-(21), wherein the vehicular power transmitting system is provided to transmit an output of an internal combustion engine to a drive wheel of a hybrid vehicle provided with the vehicular power transmitting system, and the switching restricting portion is configured to reduce an operating speed and an output torque of the internal combustion engine, for reducing a rise of a rotating speed of the coupling element.

(23) The control apparatus according to any one of the above-described modes (17)-(22), wherein the electrically controlled differential portion includes a differential limiting device operable to limit a differential function of the differential mechanism, and the switching restricting portion is configured to reduce a rise of a rotating speed of the coupling element, by commanding the differential limiting device to limit the differential function of the differential mechanism.

BRIEF DESCRIPTION OF THE DRAWINGS

The above and other objects, features, advantages, and technical and industrial significance of this invention will be better understood by reading the following detailed description of preferred embodiments of the present invention, when considered in connection with the accompanying drawings, in which.

DETAILED DESCRIPTION OF THE PREFERRED EMBODIMENT

First Embodiment

Figures 1, 2:
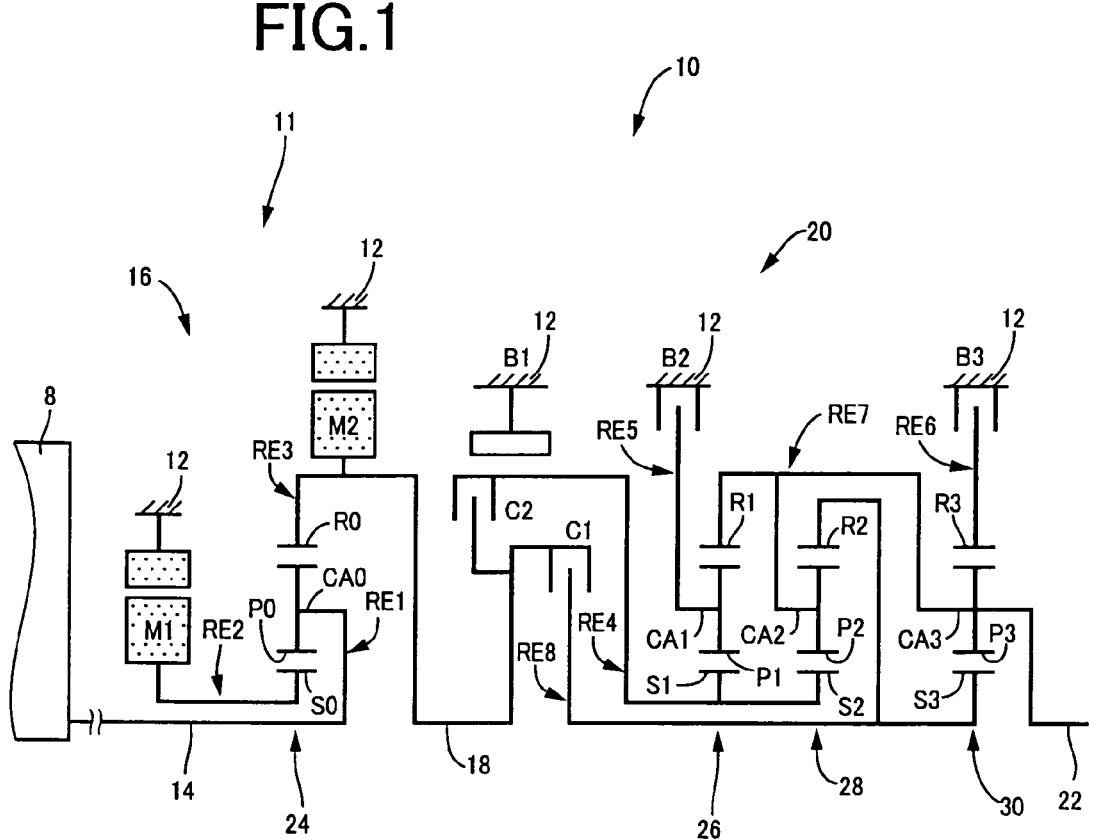
FIG. 1 is a schematic view showing an arrangement of a power transmitting system of a hybrid vehicle, which is controlled by a control apparatus constructed according to the principle of this invention.
FIG. 2 is a table indicating shifting actions of an automatic transmission portion provided in the power transmitting system of FIG. 1, in relation to different combinations of operating states of hydraulically operated frictional coupling devices to effect the respective shifting actions.
Figure 7:
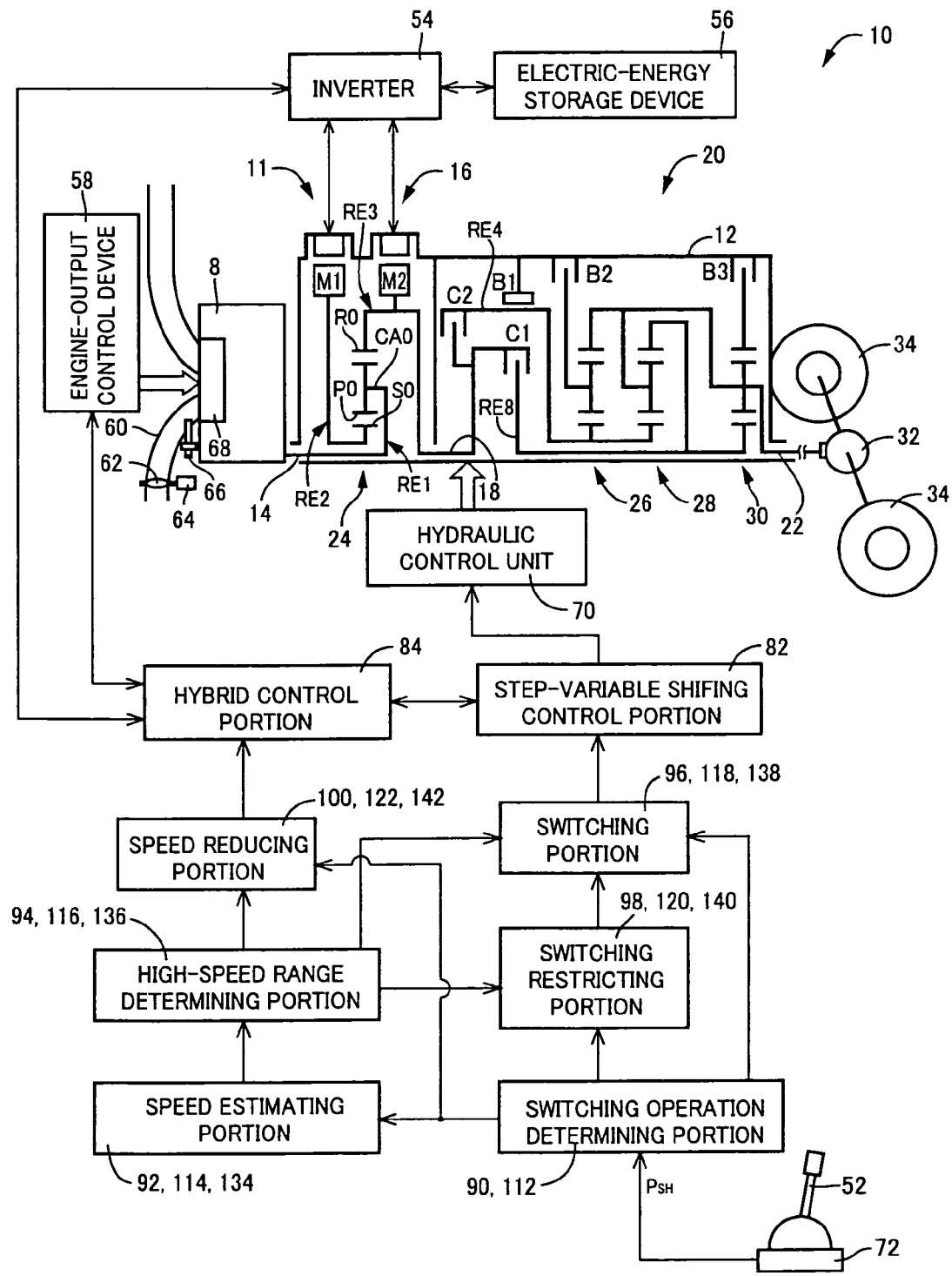
FIG. 7 is a functional block diagram illustrating major control functions of the electronic control device of FIG. 4.

Referring first to the schematic view of FIG. 1, there is shown a transmission mechanism 10 constituting a part of a power transmitting system for a hybrid vehicle, which power transmitting system is controlled by a control apparatus constructed according to a first embodiment of this invention. As shown in FIG. 1, the transmission mechanism 10 includes: an input rotary member in the form of an input shaft 14; a continuously-variable transmission portion in the form of a differential portion 11 connected to the input shaft 14 either directly, or indirectly via a pulsation absorbing damper (vibration damping device) not shown; a power transmitting portion in the form of a hydraulic automatic transmission portion 20 disposed between the differential portion 11 and drive wheels 34 (shown in FIG. 7) of the hybrid vehicle, and connected in series via a power transmitting member 18 (power transmitting shaft) to the differential portion 11 and the drive wheels 34; and an output rotary member 22 connected to the automatic transmission portion 20. The input shaft 12, differential portion 11, automatic transmission portion 20 and output rotary member 22 are coaxially disposed on a common axis in a transmission casing 12 (hereinafter referred to simply as "casing 12") functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 34, to transmit a vehicle drive force from the engine 8 to the pair of drive wheels 34 through a differential gear device 32 (final speed reduction gear) and a pair of drive axles, as shown in FIG. 7. The engine 8 may be a gasoline engine or diesel engine and functions as a vehicle drive power source directly connected to the input shaft 14 or indirectly via a pulsation absorbing damper. It will be understood that the engine 8 functions as a drive power source of the drive system.

In the present transmission mechanism 10 constructed as described above, the engine 8 and the differential portion 11 are directly connected to each other. This direct connection means that the engine 8 and the transmission portion 11 are connected to each other, without a fluid-operated power transmitting device such as a torque converter or a fluid coupling being disposed therebetween, but may be connected to each other through the pulsation absorbing damper as described above. It is noted that a lower half of the transmission mechanism 10, which is constructed symmetrically with respect to its axis, is omitted in FIG. 1. This is also true to the other embodiments of the invention described below.

The differential portion 11 is considered to be an electrically controlled differential portion in the sense that the differential state of the differential portion 11 is changed while the operating state of a first electric motor M1 is controlled. The differential portion 11 includes: the above-indicated first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is operatively connected to and rotated with the power transmitting member 18. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16, which functions as the differential mechanism, includes, as a major component, a planetary gear set 24 of a single pinion type having a gear ratio ρ1 of about 0.418, for example. The planetary gear set 24 has rotary elements consisting of: a sun gear S0, a planetary gear P0; a carrier CA0 supporting the planetary gear P0 such that the planetary gear P0 is rotatable about its axis and about the axis of the sun gear S0; and a ring gear R0 meshing with the sun gear S0 through the planetary gear P0. Where the numbers of teeth of the sun gear S0 and the ring gear R0 are represented by ZS0 and ZR0, respectively, the above-indicated gear ratio ρ0 is represented by ZS0/ZR0.

In the power distributing mechanism 16, the carrier CA0 is connected to the input shaft 14, that is, to the engine 8, and the sun gear S0 is connected to the first electric motor M1, while the ring gear R0 is connected to the power transmitting member 18. The power distributing mechanism 16 constructed as described above is operated in a differential state in which three elements of the planetary gear set 24 consisting of the sun gear S0, carrier CA0 and ring gear R0 are rotatable relative to each other, so as to perform a differential function. In the differential state, the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Namely, the differential portion 11 (power distributing mechanism 16) functions as an electric differential device, which is operable in a continuously-variable shifting state (electrically established CVT state) in which the rotating speed of the power transmitting member 18 is continuously variable, irrespective of the rotating speed of the engine 8, namely, placed in the differential state in which a speed ratio γ0 (rotating speed $N_{IN}$ of the input shaft 14/rotating speed $N_{18}$ of the power transmitting member 18) of the differential portion 11 is continuously changed from a minimum value γ0min to a maximum value γ0max, that is, in the continuously-variable shifting state in which the differential portion 11 functions as an electrically controlled continuously-variable transmission the speed ratio γ0 of which is continuously variable from the minimum value γ0min to the maximum value γ0max. Thus, the differential portion 11 functions as a continuously-variable transmission mechanism wherein a differential state between the rotating speed of the input shaft 14 and the rotating speed of the power transmitting member 18 functioning as the output shaft of the differential portion 11 is controlled by controlling the operating states of the first electric motor M1, second electric motor M2 and engine 8 that are operatively connected to the power distributing mechanism 16.

The automatic transmission-portion 20 is a step-variable automatic transmission which constitutes a part of a power transmitting path between the differential portion 11 and the drive wheels 34. The automatic transmission portion 20 includes a single-pinion type first planetary gear set 26, a single-pinion type second planetary gear set 28 and a single-pinion type third planetary gear set 30. Thus, the automatic transmission portion 20 is a multiple-step transmission of a planetary gear type. The first planetary gear set 26 has: a first sun gear S1; a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. For example, the first planetary gear set 26 has a gear ratio ρ1 of about 0.562. The second planetary gear set 28 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 28 has a gear ratio ρ2 of about 0.425. The third planetary gear set 30 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 30 has a gear ratio ρ3 of about 0.421. Where the numbers of teeth of the first sun gear S1, first ring gear R1, second sun gear S2, second ring gear R2, third sun gear S3 and third ring gear R3 are represented by ZS1, ZR1, ZS2, ZR2, ZS3 and ZR3, respectively, the above-indicated gear ratios ρ1, ρ2 and ρ3 are represented by ZS1/ZR1, ZS2/ZR2, and ZS3/ZR3, respectively.

In the automatic transmission portion 20, the first sun gear S1 and the second sun gear S2 are integrally fixed to each other as a unit, selectively connected to the power transmitting member 18 through a first clutch C1, and selectively fixed to the casing 12 through a first brake B1. The first carrier CA1 is selectively fixed to the casing 12 through a second brake B2, and the third ring gear R3 is selectively fixed to the casing 12 through a third brake B3. The first ring gear R1, second carrier CA2 and third carrier CA3 are integrally fixed to each other and fixed to the output rotary member 22. The second ring gear R2 and the third sun gear S3 are integrally fixed to each other and selectively connected to the power transmitting member 18 through a first clutch C1.

Thus, the automatic transmission portion 20 and the differential portion 11 (power transmitting member 18) are selectively connected to each other through one of the first and second clutches C1, C2, which are provided to shift the automatic transmission portion 20. In other words, the first and second clutches C1, C2 function as coupling devices operable to switch a power transmitting path between the power distributing member 18 and the automatic transmission portion 20 (power transmitting path between the differential portion 11 or power transmitting member 18 and the drive wheels 34), to a selected one of a power transmitting state in which a vehicle drive force can be transmitted through the power transmitting path, and a power cut-off state (non-power-transmitting state) in which the vehicle drive force cannot be transmitted through the power transmitting path. When at least one of the first and second clutches C1 and C2 is placed in the engaged state, the power transmitting path is placed in the power transmitting state. When both of the first and second clutches C1, C2 are placed in the released state, the power transmitting path is placed in the power cut-off state. It will be understood that the first and second clutches C1, C2 function as a switching portion operable to switch the power transmitting path between the differential portion 11 and the drive wheels 34, between the power transmitting state and the power cut-off state.

The automatic transmission portion 20 is operable to perform a so-called "clutch-to-clutch" shifting action to establish a selected one of its operating positions (gear positions) by an engaging action of one of coupling devices and a releasing action of another coupling device. The above-indicated operating positions have respective speed ratios γ (rotating speed $N_{18}$ of the power transmitting member 18/rotating speed $N_{OUT}$ of the output rotary member 22) which change as geometric series. As indicated in the table of FIG. 2, the first gear position having the highest speed ratio γ1 of about 3.357, for example, is established by engaging actions of the first clutch C1 and third brake B3, and the second gear position having the speed ratio γ2 of about 2.180, for example, which is lower than the speed ratio γ1, is established by engaging actions of the first clutch C1 and second brake B2. Further, the third gear position having the speed ratio γ3 of about 1.424, for example, which is lower than the speed ratio γ2, is established by engaging actions of the first clutch C1 and first brake B1, and the fourth gear position having the speed ratio γ4 of about 1.000, for example, which is lower than the speed ratio γ3, is established by engaging actions of the first clutch C1 and second clutch C2. The reverse gear position having the speed ratio γR of about 3.209, for example, which is intermediate between the speed ratios γ1 and γ2, is established by engaging actions of the second clutch C2 and the third brake B3, and the neutral position N is established when all of the first clutch C1, second clutch C2, first brake B1, second brake B2 and third brake B3 are placed in the released state. It is noted that the clutches C1, C2 and brakes B1, B2, B3 incorporated in the automatic transmission portion 20 are coupling elements operable to switch the power transmitting path between the engine 8 and the drive wheels 34, between the power transmitting state and the power cut-off state. It will therefore be understood that the clutches and brakes C1, C2, B1-B3 function as coupling elements, while the automatic transmission portion 20 functions as a switching portion operable to switch the above-indicated power transmitting path between the power transmitting state and the power cut-off state.

The above-described first clutch C1, second clutch C2, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C1, C2 and brakes B1-B3 is selectively engaged for connecting two members between which each clutch or brake is interposed.

In the transmission mechanism 10 constructed as described above, the differential portion 11 functioning as the continuously-variable transmission and the automatic transmission portion 20 cooperate with each other to constitute a continuously-variable transmission the speed ratio of which is continuously variable. While the differential portion 11 is controlled to hold its speed ratio constant, the differential portion 11 and the automatic transmission portion 20 cooperate to constitute a step-variable transmission the speed ratio of which is variable in steps.

When the differential portion 11 functions as the continuously-variable transmission while the automatic transmission portion 20 connected in series to the differential portion 11 functions as the step-variable transmission, the speed of the rotary motion transmitted to the automatic transmission portion 20 placed in a selected one of the gear positions M (hereinafter referred to as "input speed of the automatic transmission portion 20"), namely, the rotating speed of the power transmitting member 18 (hereinafter referred to as "transmitting-member speed $N_{18}$") is continuously changed, so that the speed ratio of the hybrid vehicle drive system when the automatic transmission portion 20 is placed in the selected gear position M is continuously variable over a predetermined range. Accordingly, an overall speed ratio γ7 of the transmission mechanism 10 (rotating speed $N_{IN}$ of the input shaft 14/rotating speed $N_{OUT}$ of the output rotary member 22) is continuously variable. Thus, the transmission mechanism 10 as a whole is operable as a continuously-variable transmission. The overall speed ratio γT is determined by the speed ratio γ0 of the differential portion 11 and the speed ratio γ of the automatic transmission portion 20.

For example, the transmitting-member speed $N_{18}$ is continuously variable over the predetermined range when the differential portion 11 functions as the continuously-variable transmission while the automatic transmission portion 20 is placed in a selected one of the first through fourth gear positions and reverse gear position as indicated in the table of FIG. 2. Accordingly, the overall speed ratio 7T of the transmission mechanism 10 is continuously variable across the adjacent gear positions.

When the speed ratio γ0 of the differential portion 11 is held constant while the clutches C and brakes B are selectively engaged to establish the selected one of the first through fourth gear positions and the reverse gear position, the overall speed ratio γT of the transmission mechanism 10 is variable in step as geometric series. Thus, the transmission mechanism 10 is operable like a step-variable transmission.

When the speed ratio γ0 of the differential portion 11 is held constant at 1, for example, the overall speed ratio γT of the transmission mechanism 10 changes as the automatic transmission portion 20 is shifted from one of the first through fourth gear positions and reverse gear position to another, as indicated in the table of FIG. 2. When the speed ratio γ0 of the differential portion 11 is held constant at a value smaller than 1, for example, at about 0.7, while the automatic transmission portion 20 is placed in the fourth gear position, the overall speed ratio γT of the transmission mechanism 10 is controlled to be about 0.7.

Figure 3:
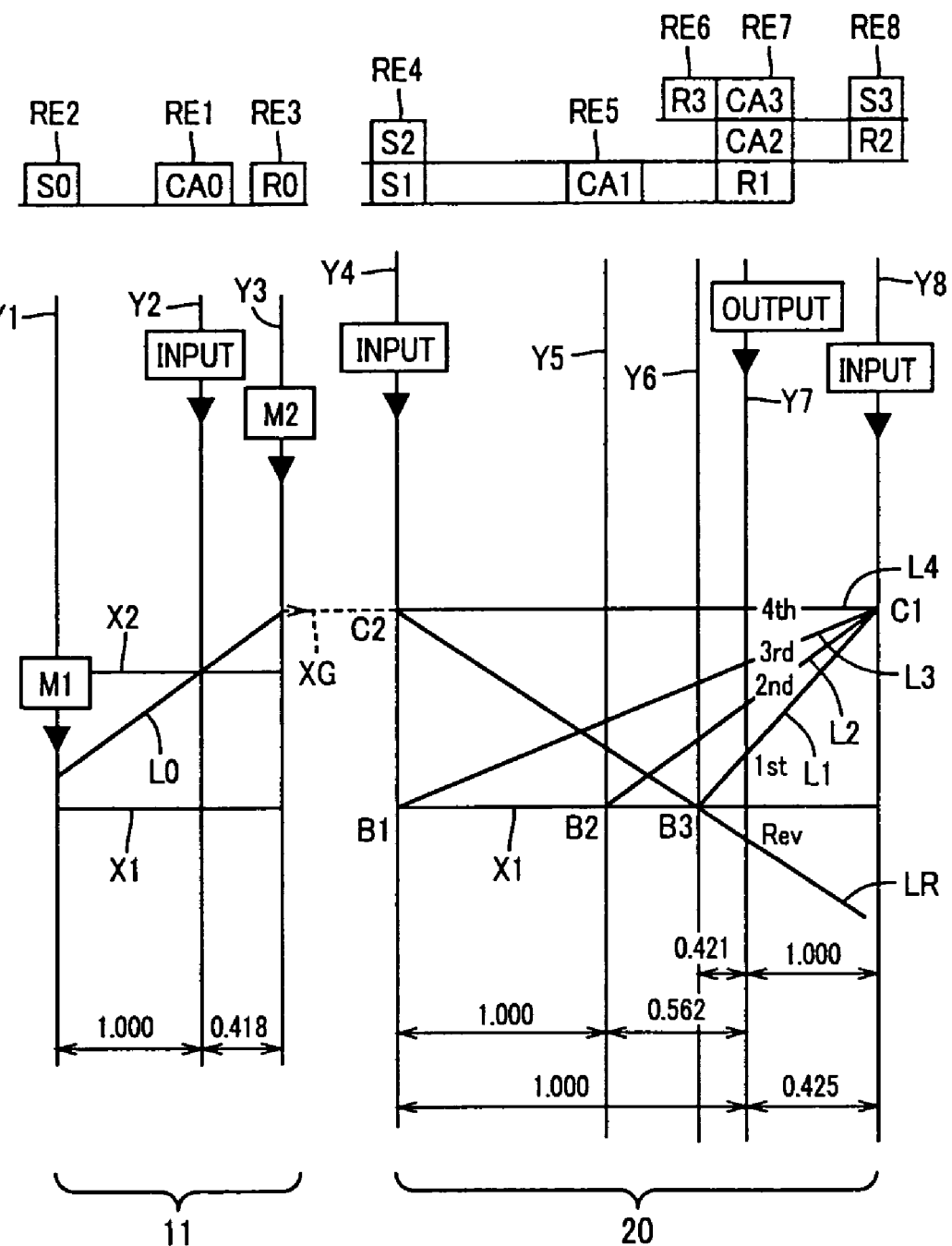
FIG. 3 is a collinear chart indicating relative rotating speeds of rotary elements of an electrically controlled differential portion and the automatic transmission portion of the power transmitting system of FIG. 1.

The collinear chart of FIG. 3 indicates, by straight lines, a relationship among the rotating speeds of the rotary elements in each of the gear positions of the transmission mechanism 10, which is constituted by the differential portion 11 and the automatic transmission portion 20. The different gear positions correspond to respective different states of connection of the rotary elements. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. The horizontal line X1 indicates the rotating speed of 0, while the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the sun gear S0, a first rotary element (first element) RE1 in the form of the carrier CA0, and a third rotary element (third element) RE3 in the form of the ring gear R0. The distances between the adjacent ones of the vertical lines Y1, Y2 and Y3 are determined by the gear ratio ρ0 of the planetary gear set 24. That is, the distance between the vertical lines Y1 and Y2 corresponds to "1", while the distance between the vertical lines Y2 and Y3 corresponds to the gear ratio ρ0. Further, five vertical lines Y4, Y5, Y6, Y7 and Y8 corresponding to the transmission portion 20 respectively represent the relative rotating speeds of a fourth rotary element (fourth element) RE4 in the form of the first and second sun gears S1, S2 integrally fixed to each other, a fifth rotary element (fifth element) RE5 in the form of the first carrier CA1, a sixth rotary element (sixth element) RE6 in the form of the third ring gear R3, a seventh rotary element (seventh element) RE7 in the form of the first ring gear R1 and second and third carriers CA2, CA3 that are integrally fixed to each other, and an eighth rotary element (eighth element) RE8 in the form of the second ring gear R2 and third sun gear S3 integrally fixed to each other. The distances between the adjacent ones of the vertical lines are determined by the gear ratios ρ1, ρ2 and ρ3 of the first, second and third planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the first, second and third planetary gear sets 26, 28, 30 corresponds to "1", while the distance between the carrier and ring gear of each planetary gear set 26, 28, corresponds to the gear ratio ρ.

Referring to the collinear-chart of FIG. 3, the power distributing mechanism 16 (differential portion 11) of the transmission mechanism 10 is arranged such that the first rotary element RE1 (carrier CA0) of the planetary gear set 24 is integrally fixed to the input shaft 14 (engine 8), and the second rotary element RE2 is fixed to the first electric motor M1, while the third rotary element RE3 (ring gear R0) is fixed to the power transmitting member 18 and the second electric motor M2, so that a rotary motion of the input shaft 14 is transmitted (input) to the automatic transmission portion 20 through the power transmitting member 18. A relationship between the rotating speeds of the sun gear S0 and the ring gear R0 is represented by an inclined straight line L0 which passes a point of intersection between the lines Y2 and X2.

In the differential state of the differential portion 11 in which the first through third rotary elements RE1-RE3 are rotatable relative to each other, for example, the rotating speed of the sun gear S0, that is, the rotating speed of the first electric motor M1, which is represented by a point of intersection between the straight line L0 and the vertical line Y1, is raised or lowered by controlling the engine speed $N_E$, so that the rotating speed of the carrier CA0 represented by a point of intersection between the straight line L0 and the vertical line Y2, if the rotating speed of the ring gear R0 represented by a point of intersection between the straight line L0 and the vertical line Y3 is substantially held constant.

When the rotating speed of the first electric motor M1 is controlled such that the speed ratio γ0 of the differential portion 11 is held at 1, so that the rotating speed of the sun gear S0 is made equal to the engine speed $N_E$, the straight line L0 is aligned with the horizontal line X2, so that the ring gear R0, that is, the power transmitting member 18 is rotated at the engine speed $N_E$. When the rotating speed of the first electric motor M1 is controlled such that the speed ratio γ0 of the differential portion 11 is held at a value lower than 1, for example at 0.7, on the other hand, so that the rotating speed of the sun gear S0 is zeroed, the power transmitting member 18 is rotated at a speed $N_{18}$ higher than the engine speed $N_E$.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output rotary member 22, while the eighth rotary element RE8 is selectively connected to the power transmitting member 18 through the first clutch C1.

The automatic transmission portion 20 is placed in the first gear position when the first clutch C1 and the third brake B3 are engaged in the state of the differential portion 11 in which a rotary motion of the differential portion 11 at a speed equal to the engine speed NE is input to the eighth rotary element RE8 of the automatic transmission portion 20. The rotating speed of the output rotary member 22 in the first gear position is represented by a point of intersection between the vertical line Y7 indicative of the rotating speed of the seventh rotary element RE7 fixed to the output rotary member 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output rotary member 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output rotary member 22. The rotating speed of the output rotary member 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output rotary member 22. The rotating speed of the output rotary member 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output rotary member 22.

Figure 4:
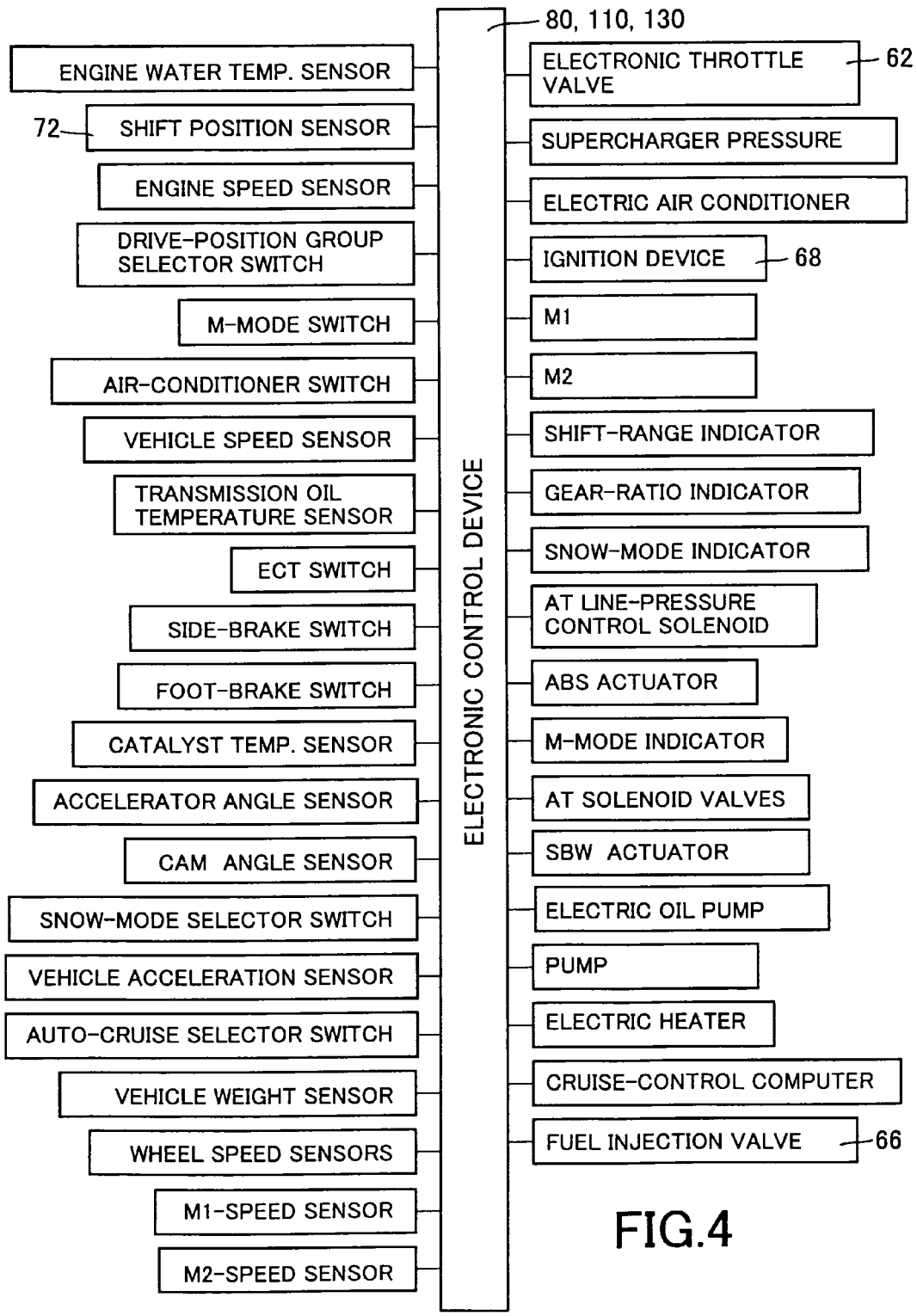
FIG. 4 is a view indicating input and output signals of an electronic control device serving as the control apparatus according to the embodiment of this invention to control the power transmitting system of FIG. 1.

FIG. 4 illustrates signals received by an electronic control device 80 provided to control the transmission mechanism 10, and signals generated by the electronic control device 80. This electronic control device 80 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and first and second electric motors M1 and M2, and drive controls such as shifting controls of the automatic transmission portion 20.

The electronic control device 80 is arranged to receive from various sensors and switches shown in FIG. 4, various signals such as: a signal indicative of a temperature $TEMP_W$ of cooling water of the engine 8; a signal indicative of a selected one of operating positions (shift positions) $P_{SH}$ of a manually operable shifting member in the form of a shift lever 52 (shown in FIG. 6); a signal indicative of the number of operations of the shift lever 52 from a manual forward-drive shifting position M (described below); a signal indicative of the operating speed $N_E$ of the engine 8; a signal indicative of a value indicating a selected group of forward-drive positions of the transmission mechanism 10; a signal indicative of an M mode (manual shifting mode); a signal indicative of an operated state of an air conditioner; a signal indicative of a vehicle speed V corresponding to the rotating speed $N_{OUT}$ of the output rotary member 22; a signal indicative of a temperature $T_{OIL}$ of a working fluid or oil of the automatic transmission portion 20; a signal indicative of an operated state of a side brake; a signal indicative of an operated state of a foot brake pedal; a signal indicative of a temperature of a catalyst; a signal indicative of a required amount of an output of the vehicle in the form of an amount of operation (an angle of operation) $A_{CC}$ of an accelerator pedal; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the wheels of the vehicle; a signal indicative of a rotating speed $N_{M1}$ of the first electric motor M1 (hereinafter referred to as "first electric motor speed $N_{M1}$, where appropriate); a signal indicative of a rotating speed $N_{M2}$ of the second electric motor M2 (hereinafter referred to as "second electric motor speed $N_{M2}$, where appropriate); and a signal indicative of an amount of electric energy SOC stored in an electric-energy storage device 60 (shown in FIG. 7).

The electronic control device 80 is further arranged to generate various signals such as: control signals to be applied to an engine output control device 58 (shown in FIG. 7) to control the output of the engine 8, such as a drive signal to drive a throttle actuator 64 for controlling an angle of opening $\theta_{TH}$ of an electronic throttle valve 62 disposed in an intake pipe 60 of the engine 8, a signal to control an amount of injection of a fuel by a fuel injecting device 66 into the intake pipe 60 or cylinders of the engine 8, a signal to be applied to an ignition device 68 to control the ignition timing of the engine 8, and a signal to adjust a supercharger pressure of the engine 8; a signal to operate the electric air conditioner; signals to operate the first and second electric motors M1 and M2; a signal to operate a shift-range indicator for indicating the selected operating or shift position of the shift lever 52; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves in the form of linear solenoid valves incorporated in a hydraulic control unit 70 (shown in FIG. 7) provided to control the hydraulic actuators of the hydraulically operated frictional coupling devices of the differential portion 11 and automatic transmission portion 20; signals to control a shift-by-wire (SBW) actuator for operating a manual valve provided in the hydraulic control unit 70, for switching a hydraulic circuit; a signal to operate a regulator valve incorporated in the hydraulic control unit 70, to regulate a line pressure PL; a signal to control an electrically operated oil pump which is hydraulic pressure source for generating a hydraulic pressure that is regulated to the line pressure PL; and a signal to drive an electric heater; a signal to be applied to a cruise-control computer.

Figure 5:
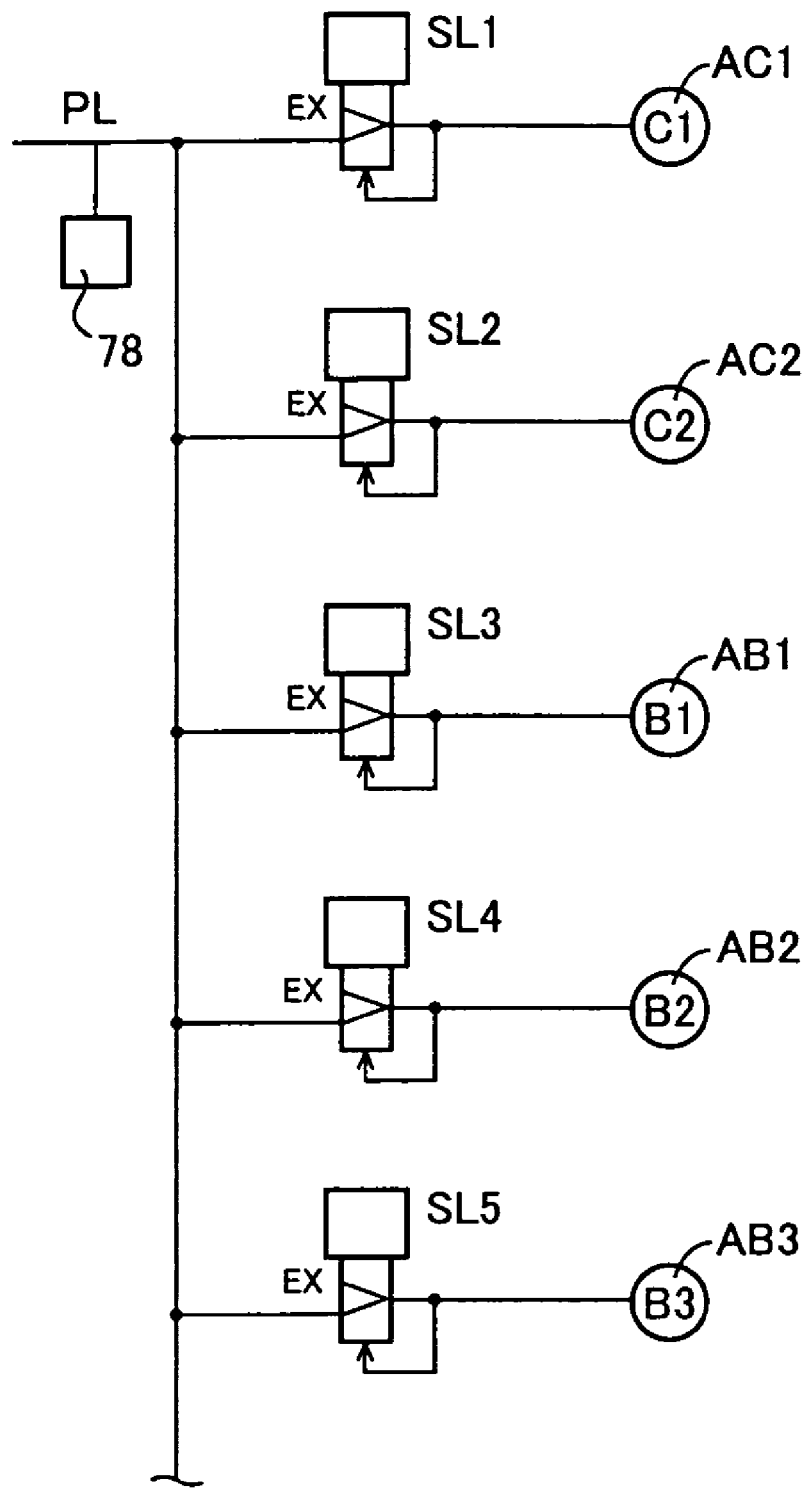
FIG. 5 is a circuit diagram showing hydraulic actuators provided in a hydraulic control unit, for operating clutches C and brakes B incorporated in the automatic transmission portion, and linear solenoid valves for controlling the hydraulic actuators.

FIG. 5 shows a hydraulic circuit of the hydraulic control unit 70 arranged to control linear solenoid valves SL1-SL5 for controlling hydraulic actuators (hydraulic cylinders) AC1, AC2, AB1, AB2 and AB3 for actuating the clutches C1, C2 and brakes B1-B3.

As shown in FIG. 5, the hydraulic actuators AC1, AC2, AB1, AB2, AB3 are connected to the respective linear solenoid valves SL1-SL5, which are controlled according to control commands from the electronic control device 80, for adjusting the line pressure PL into respective engaging pressures PC1, PC2, PB1, PB2 and PB3 to be applied directly to the respective hydraulic actuators AC1, AC2, AB1, AB2, AB3. The line pressure PL is a pressure which is generated by the mechanical oil pump 40 driven by the engine 8 or the electric oil pump 76 provided in addition to the mechanical oil pump 40, and which is regulated by a relief-type pressure regulator valve according to a load of the engine 8 as represented by the operation amount $A_{CC}$ of the accelerator pedal or the opening angle $\theta_{TH}$ of the electronic throttle valve 62, for example.

The linear solenoid valves SL1-SL5 have substantially the same construction, and are controlled independently of each other by the electronic control device 80, to adjust the hydraulic pressures of the hydraulic actuators AC1, AC2, AB1, AB2, AB3 independently of each other, for controlling the engaging pressures PC1, PC2, PB1, PB2, PB3, so that the appropriate two coupling devices (C1, C2, B1, B2, B3) are engaged to shift the automatic transmission portion 20 to the selected operating position or gear position. A shifting action of the automatic transmission portion 20 from one position to another is a so-called "clutch-to-clutch" shifting action involving an engaging action of the coupling devices (C, B) and a releasing action another of the coupling devices, which take place concurrently.

Figure 6:
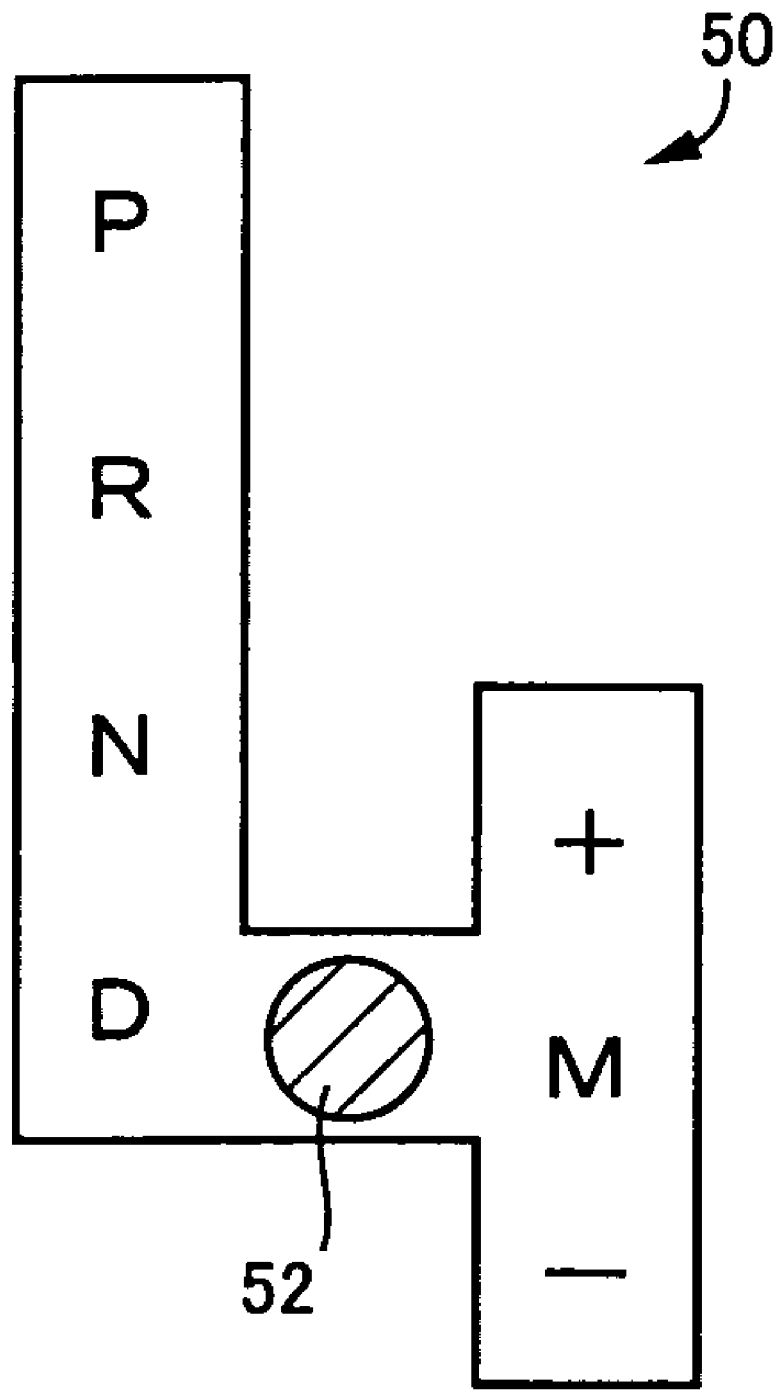
FIG. 6 is a view showing an example of a manually operated shifting device including a shift lever and operable to select one of a plurality of shift positions.

FIG. 6 shows an example of a manually operable shifting device in the form of a shifting device 50. The shifting device 50 includes the above-described shift lever 52, which is disposed laterally adjacent to an operator's seat of the vehicle, for example, and which is manually operated to select one of the plurality of operating positions $P_{SH}$. The shifting device 50 further includes a shift position sensor 72 (shown in FIG. 7) for detecting the selected operating position (shift position) $P_{SH}$ of the shift lever 52.

The operating positions $P_{SH}$ of the shift lever 52 consists of: a parking position P for placing the transmission mechanism 10 (namely, automatic transmission portion 20) in a neutral state in which a power transmitting path through the automatic transmission portion 20 is disconnected while at the same time the output rotary member 22 is placed in the locked state; a reverse-drive position R for driving the vehicle in the rearward direction; a neutral position N for placing the transmission mechanism 10 in the neutral state; an automatic forward-drive shifting position (forward-drive position) D for establishing an automatic shifting mode; and the above-indicated manual forward-drive shifting position M for establishing a manual shifting mode. In the automatic shifting mode, the overall speed ratio γT is determined by the continuously variable speed ratio of the differential portion 11 and the speed ratio of the automatic transmission portion 20 which changes in steps as a result of an automatic shifting action of the automatic transmission portion 20 from one of the first through fourth gear positions to another. In the manual shifting mode, the number of the gear positions available is limited by disabling the automatic transmission portion 20 to be shifted to the relatively high gear position or positions.

As the shift lever 52 is operated to a selected one of the operating positions $P_{SH}$, the hydraulic control unit 70 is electrically operated to switch the hydraulic circuit to establish the rear-drive position R, neutral position N, and one of the forward-drive first through fourth gear positions, as indicated in the table of FIG. 2.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power cut-off state established by releasing both of the clutches C1 and C2, as shown in the table of FIG. 2. In the drive positions R, D, M, the power transmitting path in the automatic transmission portion 20 is in the power transmitting state established by engaging at least one of the clutches C1 and C2, as also shown in the table of FIG. 2.

Described in detail, a manual, operation of the shift lever 52 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 52 from the neutral position N to the automatic forward-drive position D causes at least the first clutch C1 to be engaged for switching the power transmitting path in the automatic transmission portion 20 from the power-cut-off state to the power-transmitting state. A manual operation of the shift lever 52 from the rear-drive position R to the parking position P or neutral position N cause the second clutch C2 to be released for switching the power transmitting path in the automatic transmission portion 20 from the power-transmitting state to the power-cut-off state. A manual operation of the shift lever 52 from the automatic forward-drive position D to the neutral position N causes the first clutch C1 and the second clutch C2 to be released for switching the power transmitting path from the power-transmitting state to the power-cut-off state.

The hydraulic control unit 70 is provided with a hydraulic switching valve in the form of the above-indicated manual valve operable to cut off a hydraulic pressure supplied to the automatic transmission portion 20. The manual valve is mechanically connected to a motor-driven actuator, which is driven to operate the manual valve according to an electric command signal received through an electric wire in response to an operation of the shift lever 52. This system for operating the manual valve is called a "shift-by-wire (SBW) system. The manual valve is operated according to the operation of the shift lever 52 through the shift-by-wire system, to switch the hydraulic circuit in the hydraulic control unit 70. When the shift lever 52 is operated to the automatic forward-drive position D or manual forward-drive position M, for instance, a forward-drive hydraulic pressure is generated to permit the vehicle to run in the forward direction with the automatic transmission portion 20 placed in a selected one of the first through fourth gear positions. When the shift lever 52 is operated to the reverse-drive position R, a reverse-drive hydraulic pressure is generated to permit the vehicle to run in the backward direction. When the shift lever 52 is operated to the parking position or neutral position N, neither the forward-drive hydraulic pressure nor the reverse-drive hydraulic pressure is generated, and the power transmitting path through the automatic transmission portion 20 is held in the power cut-off state, irrespective of the operating states of the linear solenoid valves SL1-SL5.

Figure 8:
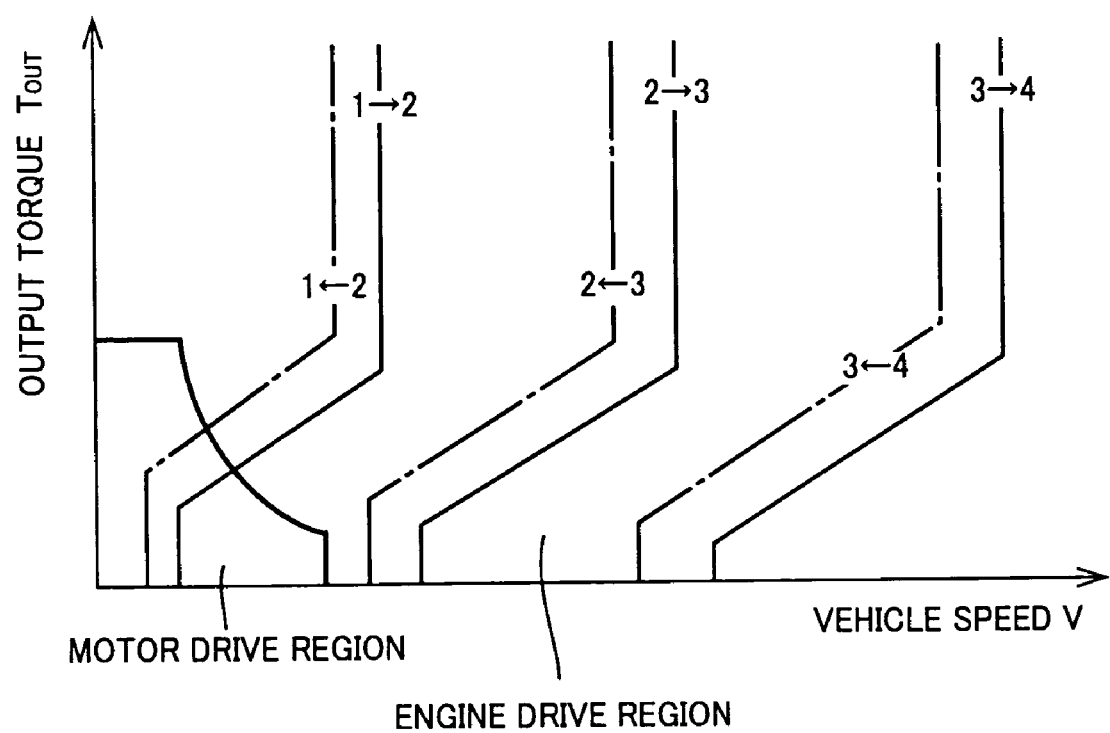
FIG. 8 is a view illustrating an example of a stored shifting boundary line map used for determining a shifting action of the automatic transmission portion, and an example of a stored drive-power-source switching boundary line map used for switch a vehicle drive mode between an engine drive mode and a motor drive mode, the shifting and switching boundary line maps being defined in the same two-dimensional coordinate system, in relation to each other.

Referring to the functional block diagram of FIG. 7, the electronic control device 80 includes a step-variable shifting control portion 82, a hybrid control portion 84, a switching operation determining portion 90, a speed estimating portion 92, a high-speed range determining portion 94, a switching portion 96, a switching restricting portion 98, and a speed reducing portion 100. The step-variable shifting control portion 82 is configured to determine whether a shifting action of the automatic transmission portion 20 should take place, that is, to determine the gear position to which the automatic transmission portion 20 should be shifted. This determination is made on the basis of a condition of the vehicle represented by the actual vehicle running speed V and the actual output torque $T_{OUT}$ of the automatic transmission portion 20, and according to a stored shifting boundary line map (shifting control map or relation) which represents shift-up boundary lines indicated by solid lines in FIG. 8 and shift-down boundary lines indicated by one-dot chain lines in FIG. 8.

The step-variable shifting control portion 82 generates a shifting command (hydraulic control command) to be applied to the hydraulic control unit 70, to engage and release the appropriate two hydraulically operated frictional coupling devices (C1, C2, B1, B2, B3), for establishing the determined gear position of the automatic transmission portion 20 according to the table of FIG. 2. Described in detail, the step-variable shifting control portion 82 commands the hydraulic control unit 70 to control the appropriate two linear solenoid valves SL incorporated in the hydraulic control unit 70, for activating the appropriate hydraulic actuators of the appropriate two frictional coupling devices (C, B) to concurrently engage one of the two frictional coupling devices and release the other frictional coupling device, to effect the clutch-to-clutch shifting action of the automatic transmission portion 20 to the determined gear position.

The hybrid control portion 84 controls the engine 8 to be operated with high efficiency, and controls the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the differential portion 11 operating as the electric continuously-variable transmission. For instance, the hybrid control portion 84 calculates a target (required) vehicle output at the present running speed V of the vehicle, on the basis of the operation amount $A_{CC}$ of the accelerator pedal 74 used as an operator's required vehicle output and the vehicle running speed V, and calculate a target total vehicle output on the basis of the calculated target vehicle output and a required amount of generation of an electric energy by the first electric motor M1. The hybrid control portion 84 calculates a target output of the engine 8 to obtain the calculated target total vehicle output, while taking account of a power transmission loss, a load acting on various devices of the vehicle, an assisting torque generated by the second electric motor M2, etc. The hybrid control portion 84 controls the speed $N_E$ and torque $T_E$ of the engine 8, so as to obtain the calculated target engine output, and the amount of generation of the electric energy by the first electric motor M1.

The hybrid control portion 84 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electric continuously-variable transmission, for optimum coordination of the engine speed $N_E$ for its efficient operation, and the rotating speed of the power transmitting member 18 determined by the vehicle speed V and the selected gear position of the transmission portion 20. That is, the hybrid control portion 82 determines a target value of the overall speed ratio γT of the transmission mechanism 10, so that the engine 8 is operated according to a stored highest-fuel-economy curve (fuel-economy map or relation). The target value of the overall speed ratio γT of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control portion 82 controls the speed ratio γ0 of the differential portion 11, so as to obtain the target value of the overall speed ratio γT, so that the overall speed ratio γT can be controlled within a predetermined range.

In the hybrid control, the hybrid control portion 84 controls an inverter 54 such that the electric energy generated by the first electric motor M1 is supplied to an electric-energy storage device 56 and the second electric motor M2 through the inverter 54. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 54 to the second electric motor M2, so that the second electric motor M2 is operated with the supplied electric energy, to produce a mechanical energy to be transmitted to the power transmitting member 18. Thus, the drive system is provided with an electric path through which an electric energy generated by conversion of a portion of a drive force of the engine 8 is converted into a mechanical energy.

The hybrid control portion 84 is further arranged to hold the engine speed $N_E$ substantially constant or at a desired value, by controlling the first electric motor speed $N_{M1}$ and/or the second electric motor speed $N_{M2}$ owing to the electric CVT function of the differential portion 11, irrespective of whether the vehicle is stationary or running. In other words, the hybrid control portion 84 is capable of controlling the first electric motor speed $N_{M1}$ as desired while holding the engine speed $N_E$ substantially constant or at a desired value. For example, the hybrid control portion 84 raises the engine speed $N_E$ by raising the first electric motor speed $N_{M1}$ during running of the vehicle while the second electric motor speed $N_{M2}$ determined by the vehicle running speed V (rotating speed of the drive wheels 34) is held substantially constant.

To raise the engine speed $N_E$ during running of the vehicle, for example, the hybrid control portion 84 raises the first electric motor speed $N_{M1}$ while the second electric motor speed $N_{M2}$ determined by the vehicle speed V (rotating speed of the drive wheels 34) is held substantially constant, as is apparent from the collinear chart of FIG. 3. To hold the engine speed $N_E$ substantially constant during a shifting action of the automatic transmission portion 20, the hybrid control portion 84 changes the first electric motor speed $N_{M1}$ in a direction opposite to a direction of change of the second electric motor speed $N_{M2}$ due to the shifting action of the automatic transmission portion 20.

The hybrid control portion 84 includes engine output control means functioning to command the engine-output control device 58 for controlling the engine 8, so as to provide a required output, by controlling the throttle actuator 64 to open and close the electronic throttle valve 62, and controlling an amount and time of fuel injection by the fuel injecting device 66 into the engine 8, and/or the timing of ignition of the igniter by the ignition device 68, alone or in combination.

For instance, the hybrid control portion 84 is basically arranged to control the throttle actuator 64 on the basis of the operation amount $A_{CC}$ of the accelerator pedal and according to a predetermined stored relationship (not shown) between the operation amount $A_{CC}$ and the opening angle $\theta_{TH}$ of the electronic throttle valve 62 such that the opening angle $\theta_{TH}$ increases with an increase of the operation amount $A_{CC}$. The engine output control device 58 controls the throttle actuator 64 to open and close the electronic throttle valve 62, controls the fuel injecting device 66 to control the fuel injection, and controls the ignition device 68 to control the ignition timing of the igniter, for thereby controlling the torque of the engine 8, according to the commands received from the hybrid control portion 84.

The hybrid control portion 84 is capable of establishing a motor-drive mode to drive the vehicle by the electric motor, by utilizing the electric CVT function (differential function) of the differential portion 11, irrespective of whether the engine 8 is in the non-operated state or in the idling state. For example, the hybrid control portion 84 establishes the motor-drive mode, when the operating efficiency of the engine 8 is relatively low, or when the vehicle speed V is comparatively low or when the vehicle is running in a low-load state. For reducing a dragging of the engine 8 in its non-operated state and improving the fuel economy in the motor-drive mode, the hybrid control portion 84 is configured to hold the engine speed $N_E$ at zero or substantially zero as needed, owing to the electric CVT function (differential function) of the differential portion 11, that is, by controlling the differential portion 11 to perform its electric CVT function, so that the first electric motor speed $N_{M1}$ is controlled to be in a non-load state, so as to be freely rotated to have a negative speed $N_{M1}$.

The hybrid control portion 84 is further capable of performing a so-called "drive-force assisting" operation (torque assisting operation) to assist the engine 8, even in the engine-drive region of the vehicle condition, by supplying an electric energy from the first electric motor M1 or the electric-energy storage device 60 to the second electric motor M2 through the above-described electric path, so that the second electric motor M2 is operated to transmit a drive torque to the drive wheels 34.

The hybrid control portion 84 is further configured to place the first electric motor M1 in a non-load state in which the first electric motor M1 is freely rotated, so that the differential portion 11 is placed in a state similar to the power cut-off state in which power cannot be transmitted through the power transmitting path within the differential portion 11, and no output can be generated from the differential portion 11. Namely, the hybrid control portion 84 is arranged to place the first electric motor M1 in the non-load state, for thereby placing the differential portion 11 in a neutral state in which the power transmitting path is electrically cut off.

The hybrid control portion 84 functions as regeneration control means for operating the second electric motor M2 as the electric generator with a kinetic energy of the running vehicle, that is, with a drive force transmitted from the drive wheels 34 toward the engine 8, during coasting of the vehicle with the accelerator pedal 74 placed in the non-operated position, or during brake application to the vehicle with hydraulically operated wheel brakes 86 for the drive wheels 34, which are shown in FIG. 7. An electric energy generated by the second electric motor M2 is stored in the electric-energy storage device 56 through the inverter 54, for improving the fuel economy of the vehicle. The amount of electric energy to be generated by the second electric motor M2 is determined on the basis of the electric energy amount SOC stored in the electric-energy storage device 56, and a desired proportion of a regenerative braking force produced by the second electric motor M2 operated as the electric generator, with respect to a total braking force which corresponds to the operating amount of a brake pedal and which consists of the regenerative braking force and a hydraulic braking force produced by the hydraulically operated wheel brakes 86.

Figure 15:
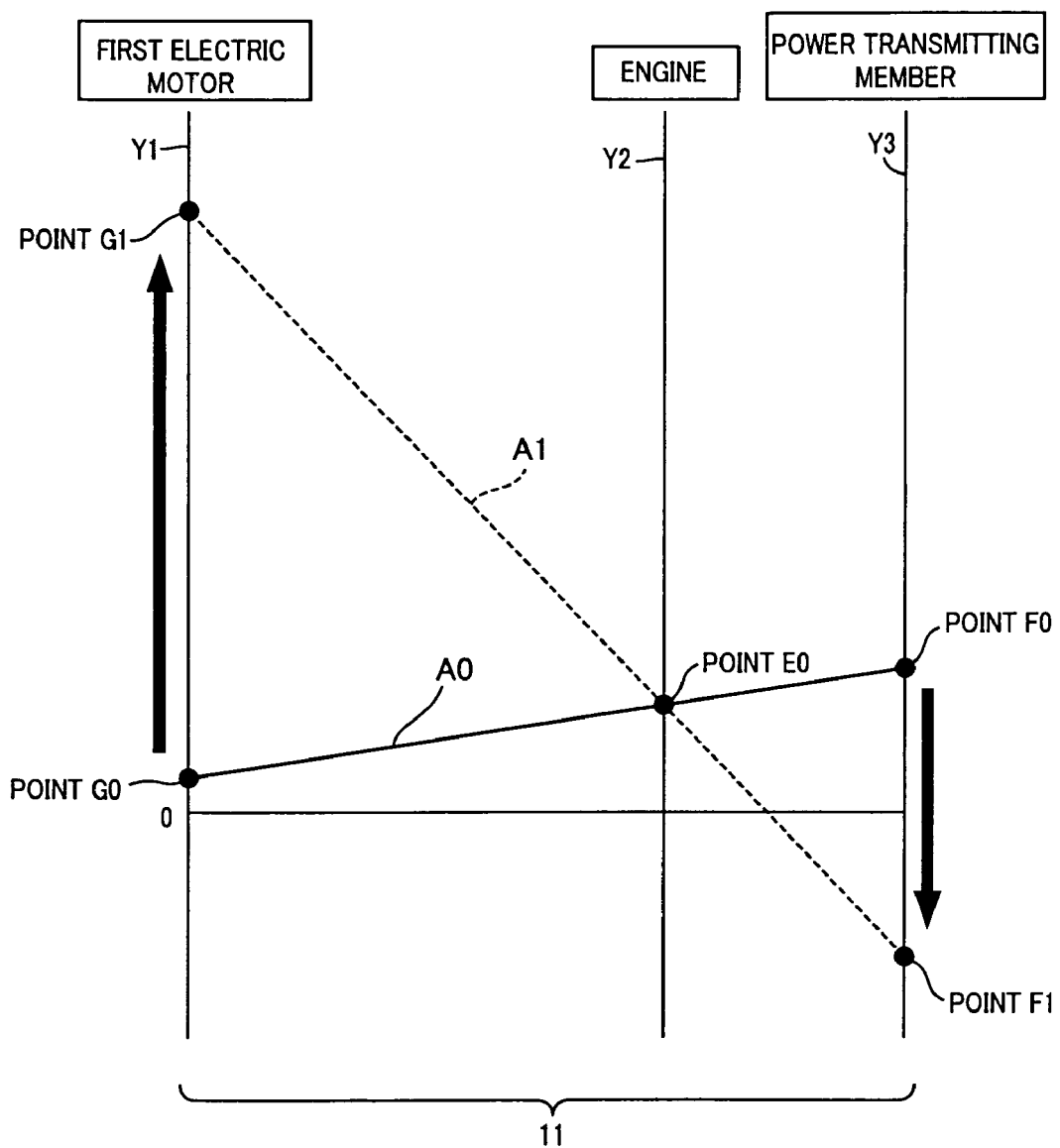
FIG. 15 is a collinear chart of the electrically controlled differential portion (between the vertical lines Y1 and Y3) of the power transmitting system, which corresponds to that of FIG. 3 for explaining a problem solved by the control routine illustrated in FIG. 9.

The direction of rotation of the power transmitting member 18 which is the output shaft of the differential portion 11 may be reversed, depending upon an operation of the shift lever 52 by the vehicle operator. For example, the power transmitting member 18 is rotated in the reverse direction when the vehicle is moved in the reverse (backward) direction on an uphill roadway even when the shift lever 52 is placed in the automatic forward-drive position D or M, or when the shift lever 52 is operated from the neutral position N to the forward-drive position D while the vehicle is moved in the reverse direction at a high speed on an uphill roadway with the shift lever 52 placed in the neutral position N. The rotary motion of the power transmitting member 18 in the reverse direction may influence the operating state of the first electric motor M1. This influence will be described referring to the collinear chart of FIG. 15, which indicates the differential portion 11 (between the vertical lines Y1 and Y3) corresponding to that of FIG. 3. It will be understood from the collinear chart that when the rotating speed $N_{18}$ of the power transmitting member 18 is changed from a point F0 to a point F1 as a result of its rotation in the reverse direction while the engine speed $N_E$ is held constant at a point E0, the first electric motor speed $N_{M1}$ is raised from a point G0 to a point G1. Thus, the rotary motion of the power transmitting member 18 influences the durability of the first electric motor M1.

In view of the above-described fact, the electronic control device 80 is configured to reduce or eliminate a risk of an excessive rise of the operating speed $N_{M1}$ of the first electric motor M1 due to an operation of the shift lever 52, as described below. It is noted that the control operation of the electronic control device 80 described below is not limited to the control when the power transmitting member 18 is rotated in the reverse direction as a result of an operation of the shift lever 52.

Referring back to the functional block diagram of FIG. 7, the switching operation determining portion 90 of the electronic control device 80 is configured to determine whether an operation of the shift lever 52 causes a switching operation to switch the power transmitting path between the output shaft (power transmitting member 18) of the differential portion 11 or the engine 8 and the drive wheels 34, from the power cut-off state to the power transmitting state, that is, whether the shift lever 52 is operated from the neutral position N to the forward-drive position D or reverse-drive position R.

When the switching operation determining portion 90 has determined that the shift lever 52 is operated to switch the above-indicated power transmitting path from the power cut-off state to the power transmitting state, the speed estimating portion 92 estimates the operating speed $N_{M1}$ of the first electric motor M1 which is established immediately after a shifting action of the automatic transmission portion 20 as a result of engaging and releasing actions of the relevant ones of the clutches C and brakes B according to the table of FIG. 2 as a result of the operation of the shift lever 52. For example, the speed estimating portion 92 estimates the rotating speed $N_{18}$ of the power transmitting member 18 and the direction of the rotation on the basis of the present vehicle speed V, the direction of running of the vehicle, and the speed ratio of the gear position of the automatic transmission portion 20 established after the shifting action. The speed estimating portion 92 can estimate the first electric motor speed $N_{M1}$ on the basis of the estimated speed $N_{18}$ of the power transmitting member 18 and the estimated direction of the rotation, and the present operating speed $N_E$ of the engine 8. Thus, the speed estimating portion 92 functions as an operating-state estimating portion operable to estimate the operating state of the first electric motor M1.

When the speed estimating portion 92 has estimated the first electric motor speed $N_{M1}$, the high-speed range determining portion 94 determines whether the estimated first electric motor speed $N_{M1}$ is higher than a predetermined upper limit $LMT_{M1}$, that is, falls in a predetermined high-speed range. Since this determination is made to reduce or eliminate the risk of an excessive rise of the first electric motor speed $N_{M1}$, irrespective of the direction of operation of the first electric motor M1, absolute values of the first electric motor speed $N_{M1}$ and upper limit $LMT_{M1}$ are used to make this determination. The upper limit upper limit $LMT_{M1}$ is obtained by experimentation as a highest permissible speed $N_{M1}$ above which the durability of the first electric motor M1 may be considerably deteriorated.

If the high-speed range determining portion 94 does not determine that the estimated first electric motor speed $N_{M1}$ is in the predetermined high-speed range while the switching operation determining portion 90 determines that the shift lever 52 is operated to switch the power transmitting path from the power cut-off state to the power transmitting state, the switching portion 96 operates the above-described manual valve according to the operation of the shift lever 52, and controls the linear solenoid valves SL1-SL5 according to the table of FIG. 2, to perform the shifting action of the automatic transmission portion 20. As a result, the power transmitting path through the automatic transmission portion 20 is switched from the power cut-off state to the power transmitting state. The switching portion 96 is further configured to inhibit the operations of the manual valve and linear solenoid valves SL1-SL5 for performing the shifting action of the automatic transmission portion 20, when the switching portion 96 receives from the switching restricting portion 98 (described below) a command to restrict the switching operation to switch the power transmitting path from the power cut-off state to the power transmitting state.

If the high-speed range determining portion 94 determines that the estimated first electric motor speed $N_{M1}$ is in the predetermined high-speed range while the switching operation determining portion 90 determines that the shift lever 52 is operated to switch the power transmitting path from the power cut-off state to the power transmitting state, the switching restricting portion 98 commands the switching portion 96 to restrict the switching operation to switch the power transmitting path from the power cut-off state to the power transmitting state, that is, to delay the switching operation. When a predetermined length of time has passed after the moment of generation of the restricting command, the switching restricting portion 98 cancels the restricting command, and commands the switching portion 96 to permit the shifting action of the automatic transmission portion 20. The predetermined length of time during which the shifting action of the automatic transmission portion 20 is inhibited is determined by experimentation while taking account of the durability of the first electric motor M1. Although the present embodiment is arranged such that the restricting command is cancelled when the predetermined length of time has passed, the restricting command may be cancelled when the engine speed $N_E$ has been lowered below a predetermined threshold. While the switching restricting portion 98 is configured to command the switching portion 96 to delay the operations of both the manual valve and the linear solenoid valves SL1-SL5 for performing the shifting action of the automatic transmission portion 20, the switching restricting portion 98 may command the switching portion 96 to delay either the operation of the manual valve or the operations of the linear solenoid valves SL1-SL5, for delaying the switching of the power transmitting path from the power cut-off state to the power transmitting state.

If the high-speed range determining portion 94 determines that the estimated first electric motor speed $N_{M1}$ is in the predetermined high-speed range while the switching operation determining portion 90 determines that the shift lever 52 is operated to switch the power transmitting path from the power cut-off state to the power transmitting state, the speed reducing portion 100 implements a control of the engine 8 so as to reduce its speed $N_E$, for instance, a fuel cut control of the engine 8, or reduces the opening angle $\theta_{TH}$ of the electronic throttle valve 62, for reducing the engine torque $T_E$ and speed $N_E$ for a predetermined length of time, and for preventing the engine speed $N_E$ from exceeding an upper limit, which is obtained by experimentation while taking account of the durability of the first electric motor M1. The speed reducing portion 100 may be configured to implement a control to reduce the second electric motor speed $N_{M2}$, concurrently with the control to reduce the engine speed $N_E$, if the former control is effective to reduce or eliminate the risk of an excessive rise of the operating speed $N_{M1}$ of the first electric motor M1. The speed reducing portion 100 may be configured such that the amounts of reduction of the engine torque $T_E$ and speed $N_E$ increase with an increase of the present first electric motor speed $N_{M1}$ or vehicle speed V, or the above-indicated upper limit of the engine speed $N_E$ decreases with the increase of the present first electric motor speed $N_{M1}$ or vehicle speed V.

Referring to the flow chart of FIG. 9, there will be described a control routine executed by the electronic control device 80, for reducing the risk of an excessive rise of the operating speed $N_{M1}$ of the first electric motor M1 as a result of an operation of the shift lever 52. This control routine is repeatedly executed with an extremely short cycle time of several milliseconds to several tens of milliseconds.

The control routine is initiated with step SA1 corresponding to the switching operation determining portion 90, to determine whether an operation of the shift lever 52 causes a switching operation to switch the power transmitting path between the output shaft (power transmitting member 18) of the differential portion 11 or the engine 8 and the drive wheels 34, from the power cut-off state to the power transmitting state, that is, whether the shift lever 52 is operated from the neutral position N to the forward-drive position D or reverse-drive position R. If an affirmative determination is obtained in step SA1, that is, if the shift lever 52 is operated to switch the above-indicated power transmitting path from the power cut-off state to the power transmitting state, the control flow goes to step SA2. If a negative determination is obtained in step SA1, the control flow goes to step SA7.

In step SA2 corresponding to the speed estimating portion 92 and high-speed range determining portion 94, the first electric motor speed $N_{M1}$ after the automatic transmission portion 20 is shifted with the engaging and releasing actions of the relevant ones of the clutches C and brakes B according to the table of FIG. 2 as a result of the operation of the shift lever 52 is estimated, and the determination is made as to whether the estimated first electric motor speed $N_{M1}$ is higher than the predetermined upper limit $LMT_{M1}$, and falls in the high-speed range. As indicated above, the absolute values of the first electric motor speed $N_{M1}$ and upper limit $LMT_{M1}$ are used to make the determination. If an affirmative determination is obtained in SA2, that is, if the estimated first electric motor speed $N_{M1}$ falls within the high-speed range, the control flow goes to step SA3. If a negative determination is obtained in step SA2, the control flow goes to step SA6.

In step SA3 corresponding to the switching restricting portion 98, the operations to switch the above-indicated power transmitting path from the power cut-off state to the power transmitting state are restricted, namely, delayed. Descried more specifically, the operation of the manual valve and the operations of the linear solenoid valves SL1-SL5 according to the operation of the shift lever 52 are delayed. Step SA3 is followed by step SA4.

In step SA4 corresponding to the speed reducing portion 100, the control to reduce the engine speed $N_E$ is implemented, by performing the fuel cut of the engine 8 or reducing the opening angle $\theta_{TH}$ of the electronic throttle valve 62, for example, to reduce the engine torque $T_E$ and engine speed $N_E$ for the predetermined length of time and for preventing the engine speed $N_E$ from exceeding the upper limit, which is obtained by experimentation while taking account of the durability of the first electric motor M1. Step SA4 is followed by step SA5. The second electric motor speed $N_{M2}$ may be reduced concurrently with the control to reduce the engine speed $N_E$, if the reduction of the second electric motor speed $N_{M2}$ is effective to reduce or eliminate the risk of an excessive rise of the operating speed $N_{M1}$ of the first electric motor M1.

In step SA5, the manual valve is operated to the forward-drive position D or reverse-drive position R according to the operation of the shift lever 52, so that the hydraulic circuit in the hydraulic control unit 70 is switched to operate the linear solenoid valves SL1-SL5 according to the table of FIG. 2, for performing the shifting action of the automatic transmission portion 20. Accordingly, the power transmitting path through the automatic transmission portion 20 is switched from the power cut-off state to the power transmitting state.

In step SA6, the manual valve is operated to the forward-drive position D or reverse-drive position R according to the operation of the shift lever 52, so that the hydraulic circuit in the hydraulic control unit 70 is switched to operate the linear solenoid valves SL1-SL5 according to the table of FIG. 2, for performing the shifting action of the automatic transmission portion 20, as in step SA5. It will be understood that steps SA5 and SA6 correspond to the switching portion 96.

In step SA7 which is implemented when the negative determination is obtained in step SA1, that is, when the operation of the shift lever 52 does not cause a risk of an excessive rise of the first electric motor speed $N_{M1}$, other controls such as a normal shifting control of the automatic transmission portion 20 are implemented.

Figure 9:
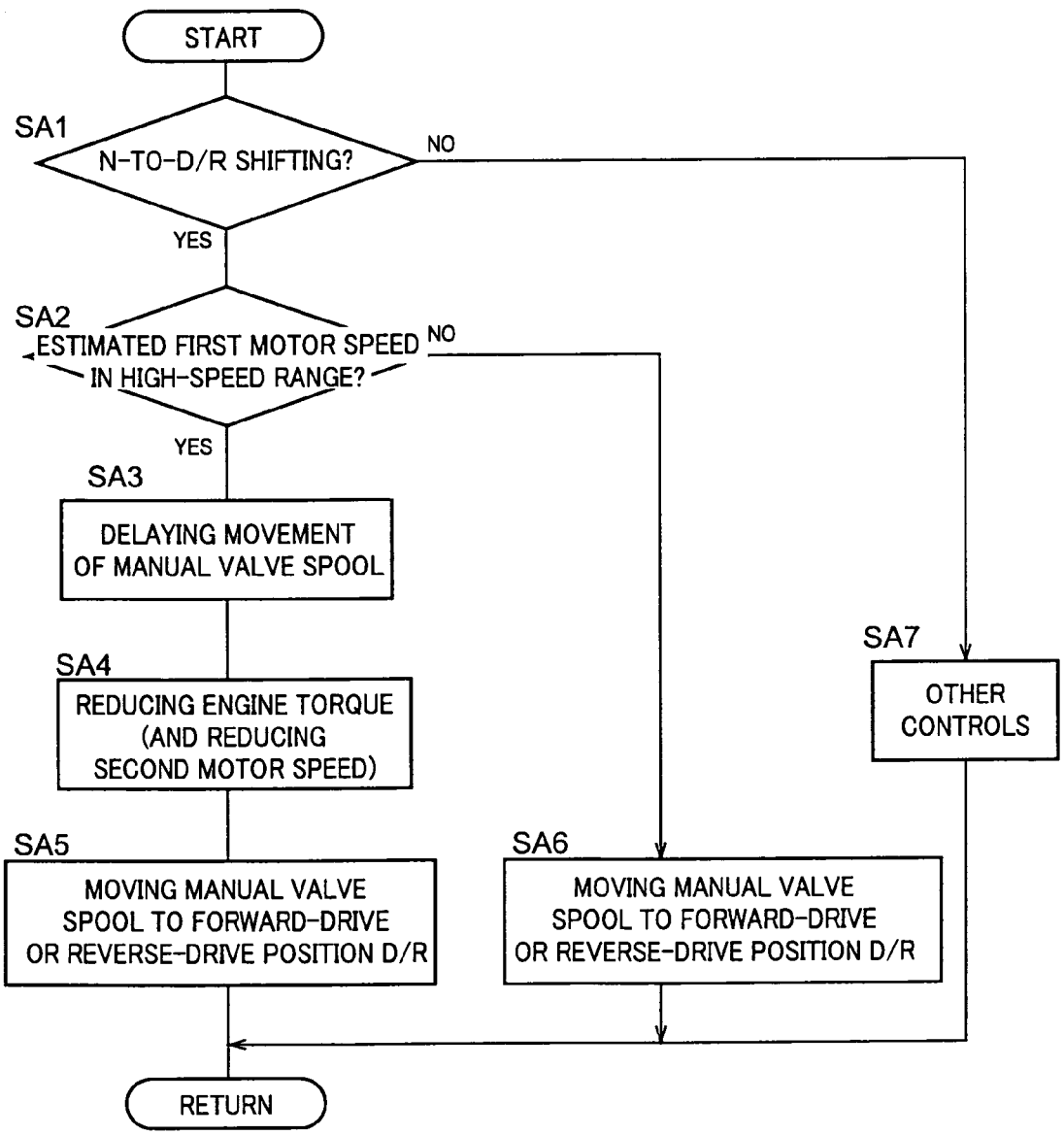
FIG. 9 is a flow chart illustrating a control routine executed by the electronic control device of FIG. 4 according to a first embodiment of this invention, for reducing a risk of an excessive rise of the operating speed of a electric motor as a result of an operation of the shift lever.
Figure 10:
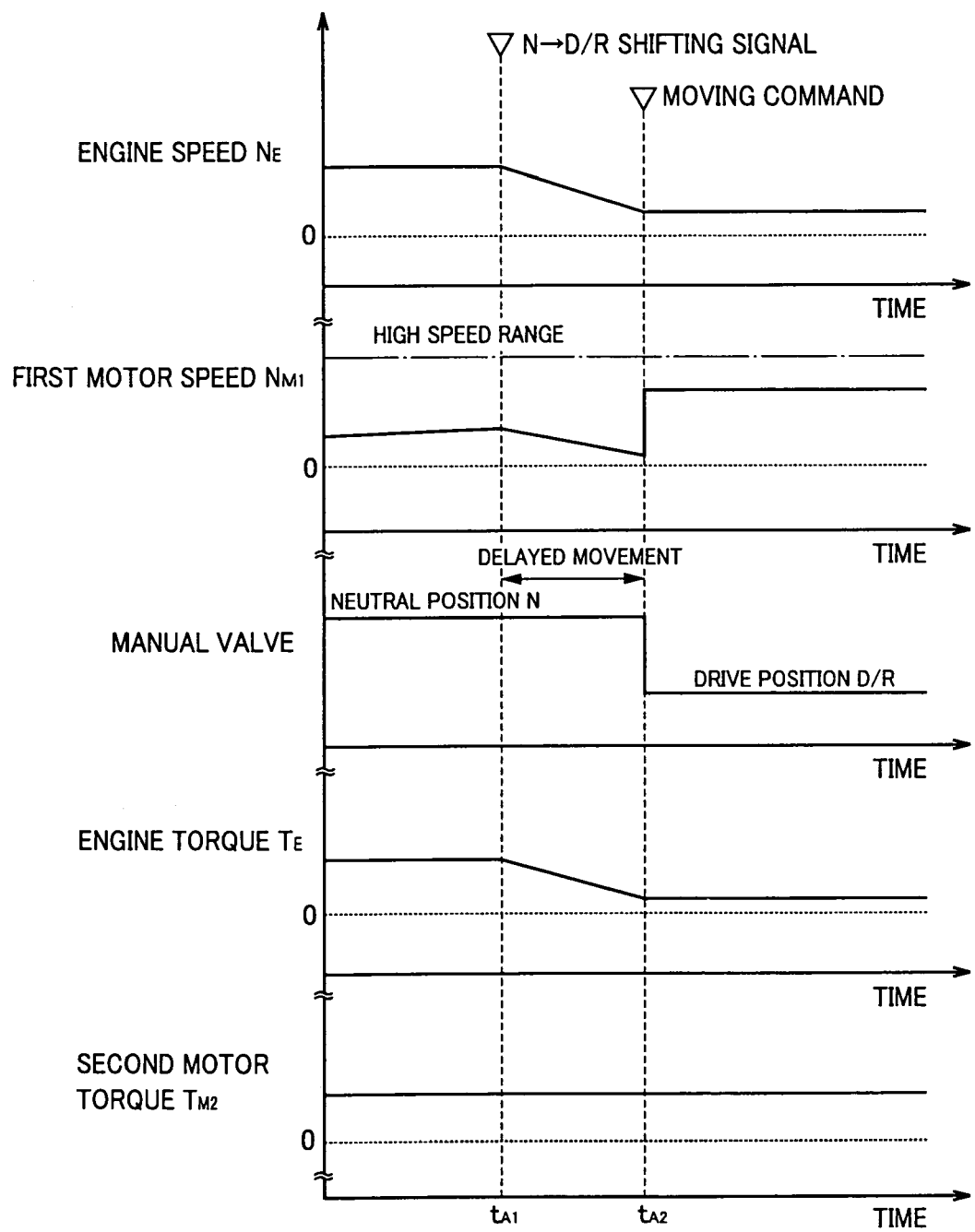
FIG. 10 is a time chart for explaining the control routine illustrated in the flow chart of FIG. 9, where the shift lever is operated from a neutral position N to a forward-drive position D or reverse-drive position R, and an operation of a manual valve and a shifting action of the automatic transmission portion are delayed.

Reference is now made to the time chart of FIG. 10 for explaining the control routine illustrated in the flow chart of FIG. 9, where the shift lever 52 is operated from the neutral position N to the forward-drive position D or reverse-drive position R, and a shifting action of the automatic transmission portion 20 is delayed by restricting the operation of the manual valve and the operations of the linear solenoid valves SL1-SL5.

At a point of time $T_{A1}$ indicated in FIG. 10, the shift lever 52 is operated from the neutral position N to the forward-drive position D or reverse-drive position R. The presently selected position $P_{SH}$ of the shift lever 52 is detected on the basis of an output signal of the shift position sensor 72. When the shift lever 52 is operated from the neutral position N to the forward-drive position D or reverse-drive position R, the affirmative determination is obtained in step SA1 of the control routine of FIG. 9. In the specific example of FIG. 10, the first electric motor speed $N_{M1}$ estimated in step SA2 is higher than the predetermined upper limit $LMT_{M1}$ and falls in the high-speed range, so that steps SA3 through SA5 are implemented. Described in detail, the movement of the spool of the manual valve from the neutral position N to the forward-drive position D or reverse-drive position R is delayed up to a point of time $T_{A2}$, as a result of implementation of step SA3. If step SA3 was not implemented, the spool of the manual valve would be moved from the neutral position N to the drive position D, R at the point of time $T_{A1}$. During the time period from the point of time $T_{A1}$ to the point of time $T_{A2}$, the engine torque $T_E$ and engine speed $N_E$ are reduced as a result of implementation of step SA4, so that the first electric motor speed $N_{M1}$ is reduced.

At the point of time $T_{A2}$, step SA5 is implemented to move the spool of the manual valve to the forward-drive position D or reverse-drive position R according to the operation of the shift lever 52, so that the power transmitting path indicated above is switched from the power cut-off state to the power transmitting state, whereby rotary motions of the drive wheels 34 are transmitted to the power transmitting member 18 which is the output shaft of the differential portion 11. Accordingly, the first electric motor speed $N_{M1}$ is raised at the point of time $T_{A2}$ due to the differential function of the differential portion 11. Although the first electric motor speed $N_{M1}$ is raised at the point of time $T_{A2}$, the raised first electric motor speed $N_{M1}$ will not fall in the high-speed range, since the engine torque $T_E$ and engine speed $N_E$ are reduced during the time period from the point of time $T_{A1}$ to the point of time $T_{A2}$.

The vehicular control apparatus in the form of the electronic control device 80 according to the present embodiment has the following advantages (A1) through (A5):

(A1) If the estimated first electric motor speed $N_{M1}$ after the shifting action of the automatic transmission portion 20 is performed with the engaging and releasing actions of the relevant ones of the clutches C and brakes B according to the table of FIG. 2 as a result of the operation of the shift lever 52 is in the predetermined high-speed range, the switching operation to switch the power transmitting path between the engine 8 and the drive wheels 34 from the power cut-off state to the power transmitting state is restricted, that is, delayed so that the risk of an excessive rise of the first electric motor speed $N_{M1}$ due to the switching of the power transmitting path can be reduced at an earlier point of time than when the switching operation is not restricted.

(A2) The switching operation of the power transmitting path is delayed when the absolute value of the operating speed $N_{M1}$ of the first electric motor M1 estimated by the speed estimating portion 92 is higher than the predetermined upper limit $LMT_{M1}$ and falls in the high-speed range, so that the risk of a rise of the operating speed of the first electric motor M1 beyond the upper limit can be reduced at an earlier point of time than when the switching operation is not restricted. Accordingly, the rise of the first electric motor speed $N_{M1}$ beyond the upper limit $LMT_{M1}$ can be reduced at an earlier point of time than when the switching operation is not delayed.

(A3) If the first electric motor speed $N_{M1}$ estimated by the speed estimating portion 92 falls in the high-speed range, the engine speed $N_E$ is reduced by the speed reducing portion 100, to reduce the first electric motor speed $N_{M1}$, so that the rise of the first electric motor speed $N_{M1}$ into the high-speed range due to the switching of the power transmitting path can be prevented.

(A4) The differential state of the power distributing mechanism 16 of the differential portion 11 of the transmission mechanism 10 is controlled while the operating state of the first electric motor M1 operatively connected to the power distributing mechanism 16 is controlled. Accordingly, the output torque of the differential portion 11 to be transmitted to the drive wheels 34 can be changed according to the operating state of the first electric motor M1. Further, the differential portion 11 is operable as a continuously-variable transmission mechanism when the operating state of the first electric motor M1 is controlled, so that the output torque of the differential portion 11 can be smoothly changed. The differential portion 11 which is operable as the continuously-variable transmission mechanism the speed ratio $\gamma 0$ of which is continuously variable is also operable as a step-variable transmission the speed ratio $\gamma 0$ of which is variable in steps.

(A5) When the switching operation determining portion 90 determines that the shift lever 52 is operated from the neutral position N to the forward-drive position D or reverse-drive position R, the first electric motor speed $N_{M1}$ after the automatic transmission portion 20 is shifted to switch the power transmitting path (between the output shaft of the differential portion 11 in the form of the power transmitting member 18 and the drive wheels 34) from the power cut-off state to the power transmitting state as a result of the operation of the shift lever 52 is estimated. If the estimated first electric motor speed $N_{M1}$ is higher than the upper limit $LMT_{M1}$, the switching of the power transmitting path from the power cut-off state to the power transmitting state is delayed to adequately reduce or eliminate the risk of an excessive rise of the first electric motor speed $N_{M1}$ beyond the upper limit $LMT_{M1}$.

Other embodiments of this invention will be described. In the following embodiments, the same reference signs as used in the first embodiment will be used to identify the same elements.

Second Embodiment

When the shift lever 52 is operated by the vehicle operator from the forward-drive position D to the neutral position N during running of the vehicle, for example, the automatic transmission portion 20 is brought into the neutral state in which the power transmitting path between the second electric motor M2 and the drive wheels 34 is placed in the power cut-off state. In this power cut-off state, a load acting in a direction that reduces a rise of the rotating speed of the power transmitting member 18 which is the output shaft of the differential portion 11 is abruptly reduced, causing a rapid rise of the operating speed of the second electric motor M2 connected to the power transmitting member 18, which rapid rise adversely influences the durability of the second electric motor M2. In view of this drawback, an electronic control device 110 (shown in FIG. 4) according to the second embodiment of the present invention is configured to reduce or eliminate a risk of an excessive rise of the operating speed of the second electric motor M2.

The electronic control device 110 provided in the second embodiment in place of the electronic control device 80 provided in the first embodiment includes a switching operation determining portion 112, a speed estimating portion 114, a high-speed range determining portion 116, a switching portion 118, a switching restricting portion 120, and a speed reducing portion 122, which are also shown in the functional block diagram of FIG. 7.

The switching operation determining portion 112 of the electronic control device 110 is configured to determine whether an operation of the shift lever 52 causes a switching operation to switch the power transmitting path between the engine 8 or second electric motor M2 and the drive wheels 34, from the power transmitting state to the power cut-off, that is, whether the shift lever 52 is operated from the automatic forward-drive position D or manual forward-drive position M to the neutral position N.

When the switching operation determining portion 112 has determined that the shift lever 52 is operated to switch the above-indicated power transmitting path from the power transmitting state to the power cut-off state, the speed estimating portion 114 estimates the operating speed $N_{M2}$ of the second electric motor M2 which is established immediately after the power transmitting path through the automatic transmission portion 20 is cut off with the releasing actions of the relevant ones of the clutches C and brakes B according to the table of FIG. 2 as a result of the operation of the shift lever 52.

For example, the speed estimating portion 114 can estimate the second electric motor speed $N_{M2}$ on the basis of the present vehicle speed V and the present operation amount $A_{CC}$ of the accelerator pedal, and according to a predetermined relationship of the second electric motor speed $N_{M2}$ with the vehicle speed V and operation amount $A_{CC}$, which relationship is obtained by experimentation conducted when the power transmitting path through the automatic transmission portion 20 is placed in the cut-off state. Thus, the speed estimating portion 114 functions as an operating-state estimating portion operable to estimate the operating state of the second electric motor M2.

When the speed estimating portion 114 has estimated the second electric motor speed $N_{M2}$, the high-speed range determining portion 116 determines whether the estimated second electric motor speed $N_{M2}$ is higher than a predetermined upper limit $LMT_{M2}$, that is, falls in a predetermined high-speed range. Since this determination is made to reduce or eliminate the risk of an excessive rise of the second electric motor speed $N_{M2}$, irrespective of the direction of rotation of the second electric motor M2, absolute values of the second electric motor speed $N_{M2}$ and upper limit $LMT_{M2}$ are used to make this determination. The upper limit upper limit $LMT_{M2}$ is obtained by experimentation as a highest permissible speed $N_{M2}$ above which the durability of the second electric motor M2 may be considerably deteriorated.

If the high-speed range determining portion 116 does not determine that the estimated second electric motor speed $N_{M2}$ is in the predetermined high-speed range while the switching operation determining portion 112 determines that the shift lever 52 is operated to switch the power transmitting path from the power transmitting state to the power cut-off state, the switching portion 118 operates the above-described manual valve according to the operation of the shift lever 52, and controls the linear solenoid valves SL1-SL5 according to the table of FIG. 2, to switch the power transmitting path through the automatic transmission portion 20 from the power transmitting state to the power cut-off state. The switching portion 118 is further configured to inhibit the operations of the manual valve and linear solenoid valves SL1-SL5 for shifting the automatic transmission portion 20 to the cut-off state, when the switching portion 118 receives from the switching restricting portion 120 (described below) a command to restrict the switching operation to switch the power transmitting path from the power transmitting state to the power cut-off state.

If the high-speed range determining portion 116 determines that the estimated second electric motor speed $N_{M2}$ is in the predetermined high-speed range while the switching operation determining portion 112 determines that the shift lever 52 is operated to switch the power transmitting path from the power transmitting state to the power cut-off state, the switching restricting portion 120 commands the switching portion 118 to restrict the switching operation to switch the power transmitting path from the power transmitting state to the power cut-off state, that is, to delay the switching operation. When a predetermined length of time has passed after the moment of generation of the restricting command, the switching restricting portion 120 cancels the restricting command, and commands the switching portion 118 to permit the shifting action of the automatic transmission portion 20. The predetermined length of time during which the shifting action of the automatic transmission portion 20 is inhibited is determined by experimentation while taking account of the durability of the second electric motor M2. Although the present second embodiment is arranged such that the restricting command is cancelled when the predetermined length of time has passed, the restricting command may be cancelled when the engine speed $N_E$ has been lowered below a predetermined threshold.

If the high-speed range determining portion 116 determines that the estimated second electric motor speed $N_{M2}$ is in the predetermined high-speed range while the switching operation determining portion 112 determines that the shift lever 52 is operated to switch the power transmitting path from the power transmitting state to the power cut-off state, the speed reducing portion 122 implements a control of the engine 8 so as to reduce its speed $N_E$, for instance, a fuel cut control of the engine 8, or reduces the opening angle $\theta_{TH}$ of the electronic throttle valve 62, for reducing the engine torque $T_E$ and speed $N_E$ for a predetermined length of time, and for preventing the engine speed $N_E$ from exceeding an upper limit, which is obtained by experimentation while taking account of the durability of the second electric motor M2. The speed reducing portion 122 may be configured to implement a control to reduce the output torque $T_{M2}$ of the second electric motor M2 (hereinafter referred to as "second electric motor torque $T_{M2}$"), concurrently with the control to reduce the engine speed $N_E$, if the former control is effective to reduce or eliminate the risk of an excessive rise of the operating speed $N_{M2}$ of the second electric motor M2. The speed reducing portion 122 may be configured such that the amounts of reduction of the second electric motor torque $T_{M2}$, engine torque $T_E$ and speed $N_E$ increase with an increase of the present second electric motor speed $N_{M2}$, or the above-indicated upper limit of the engine speed $N_E$ decreases with the increase of the present second electric motor speed $N_{M2}$.

Referring to the flow chart of FIG. 11, there will be described a control routine executed by the electronic control device 110 according to the second embodiment of this invention, for reducing a risk of an excessive rise of the operating speed of the second electric motor M2 as a result of an operation of the shift lever; 52. This control routine is repeatedly executed with an extremely short cycle time of several milliseconds to several tens of milliseconds. It is noted that step SB7 of FIG. 11 corresponds to step SA7 of FIG. 9. Only a portion of the control routine of FIG. 11 which is different from that of FIG. 9 will be described.

The control routine is initiated with step SB1 corresponding to the switching operation determining portion 112, to determine whether an operation of the shift lever 52 causes a switching operation to switch the power transmitting path between the engine 8 or second electric motor M2 and the drive wheels 34, from the power transmitting state to the power cut-off state, that is, whether the shift lever 52 is operated from the automatic forward-drive position D or manual forward-drive position M to the neutral position N. If an affirmative determination is obtained in step SB1, that is, if the shift lever 52 is operated to switch the above-indicated power transmitting path from the transmitting state to the power cut-off state, the control flow goes to step SB2. If a negative determination is obtained in step SB1, the control flow goes to step SB7.

In step SB2 corresponding to the speed estimating portion 114 and high-speed range determining portion 116, the second electric motor speed $N_{M2}$ after the power transmitting path through the automatic transmission portion 20 is placed in the cut-off state with the releasing actions of the relevant ones of the clutches C and brakes B according to the table of FIG. 2 as a result of the operation of the shift lever 52 is estimated, and the determination is made as to whether the estimated second electric motor speed $N_{M2}$ is higher than the predetermined upper limit $LMT_{M2}$, and falls in the high-speed range. As indicated above, the absolute values of the second electric motor speed $N_{M2}$ and upper limit $LMT_{M2}$ are used to make the determination. If an affirmative determination is obtained in SB2, that is, if the estimated second electric motor speed $N_{M2}$ falls within the high-speed range, the control flow goes to step SB3. If a negative determination is obtained in step SB2, the control flow goes to step SB6.

In step SB3 corresponding to the switching restricting portion 120, the operations to switch the above-indicated power transmitting path from the power transmitting state to the power cut-off state are restricted, namely, delayed. Descried more specifically, the operation of the manual valve and the operations of the linear solenoid valves SL1-SL5 according to the operation of the shift lever 52 are delayed. Step SB3 is followed by step SB4.

In step SB4 corresponding to the speed reducing portion 122, the control to reduce the engine speed $N_E$ is implemented, by performing the fuel cut of the engine 8 or reducing the opening angle $\theta_{TH}$ of the electronic throttle valve 62, for example, to reduce the engine torque $T_E$ and engine speed $N_E$ for the predetermined length of time and for preventing the engine speed $N_E$ from exceeding the upper limit, which is obtained by experimentation while taking account of the durability of the second electric motor M1. Step SB4 is followed by step SB5. The second electric motor torque $T_{M2}$ may be reduced concurrently with the control to reduce the engine speed $N_E$, if the reduction of the second electric motor torque $T_{M2}$ is effective to reduce or eliminate the risk of an excessive rise of the operating speed $N_{M2}$ of the second electric motor M2.

In step SB5, the manual valve is operated to the neutral position D according to the operation of the shift lever 52, so that the hydraulic circuit in the hydraulic control unit 70 is switched to release the relevant ones of the clutches C and brakes B according to the table of FIG. 2. Accordingly, the power transmitting path through the automatic transmission portion 20 is switched from the power transmitting state to the power cut-off state.

In step SB6, the manual valve is operated to the neutral position N according to the operation of the shift lever 52, so that the hydraulic circuit in the hydraulic control unit 70 is switched to release the relevant ones of the clutches C and brakes according to the table of FIG. 2, as in step SB5. It will be understood that steps SBA5 and SBA6 correspond to the switching portion 118.

Figure 11:
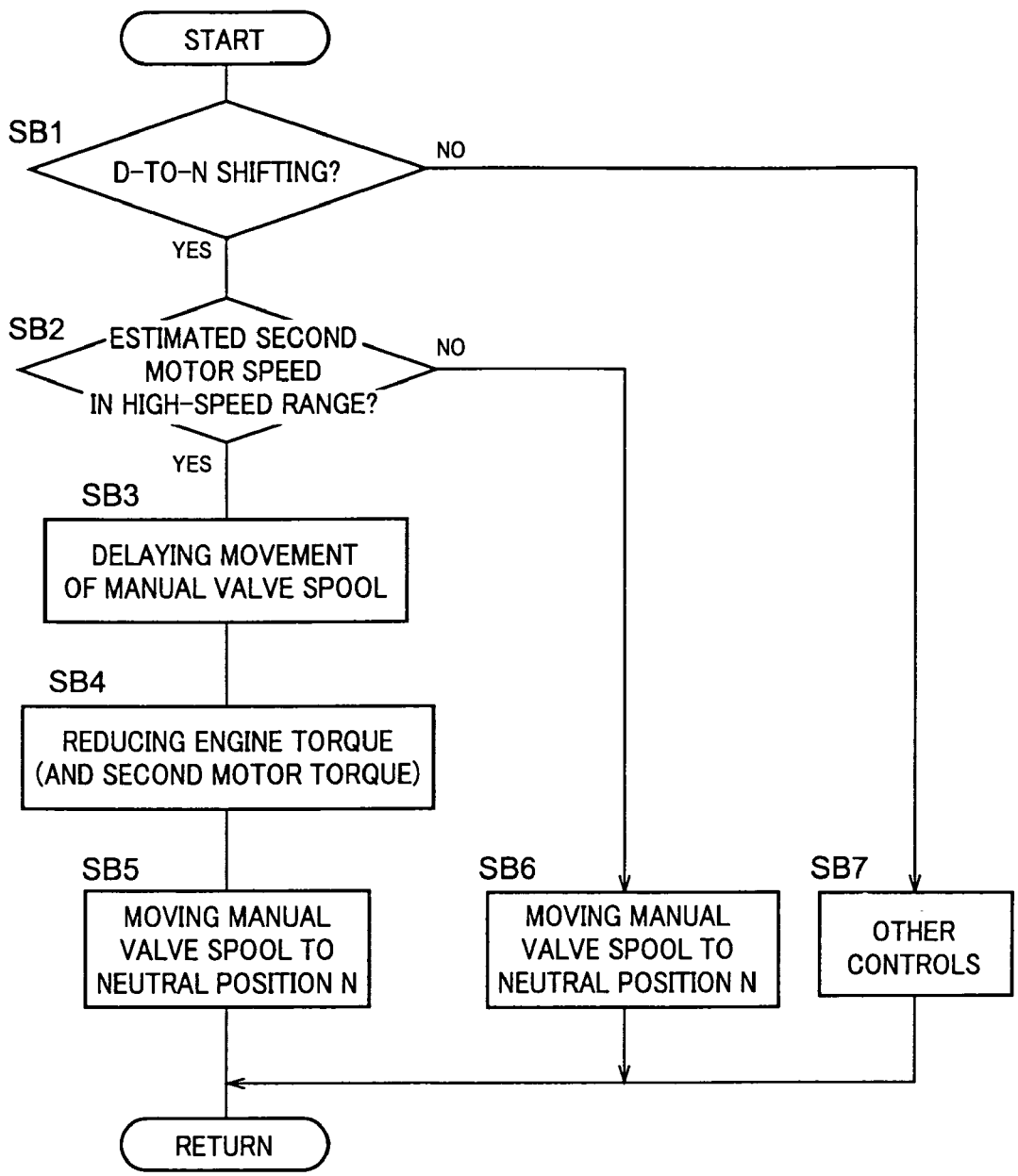
FIG. 11 is a flow chart illustrating a control routine executed by the electronic control device of FIG. 4 according to a second embodiment of the invention, for reducing a risk of an excessive rise of the operating speed of a second electric motor as a result of an operation of the shift lever.
Figure 12:
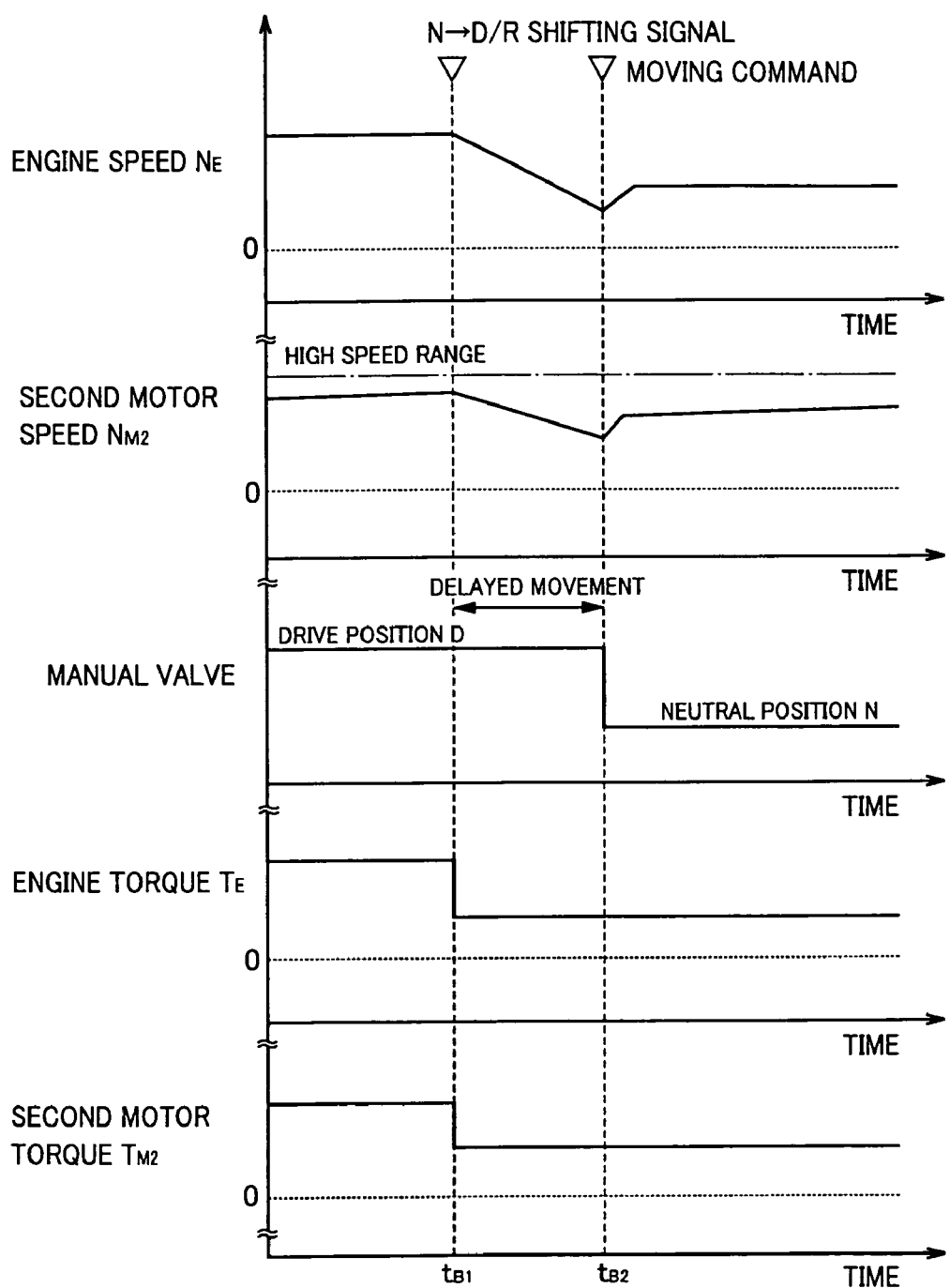
FIG. 12 is a time chart for explaining the control routine illustrated in the flow chart of FIG. 11, where the shift lever is operated from the forward-drive position D to the neutral position N, and the operation of the manual valve and the shifting action of the automatic transmission portion are delayed.

Reference is now made to the time chart of FIG. 12 for explaining the control routine illustrated in the flow chart of FIG. 11, where the shift lever 52 is operated from the automatic forward-drive position D to the neutral position N, and the shifting action of the automatic transmission portion 20 to the neutral position N is delayed by restricting the operation of the manual valve and the operations of the linear solenoid valves SL1-SL5.

At a point of time $T_{B1}$ indicated in FIG. 12, the shift lever 52 is operated from the forward-drive position D to the neutral position N. When the shift lever 52 is operated from the forward-drive position D to the neutral position N, the affirmative determination is obtained in step SB1 of the control routine of FIG. 11. In the specific example of FIG. 12, the second electric motor speed $N_{M2}$ estimated in step SB2 is higher than the predetermined upper limit $LMT_{M2}$ and falls in the high-speed range, so that steps SB3 through SB5 are implemented. Described in detail, the movement of the spool of the manual valve from the forward-drive position D to the neutral position N is delayed up to a point of time $T_{B2}$, as a result of implementation of step SB3. If step SB3 was not implemented, the spool of the manual valve would be moved from the forward-drive position D to the neutral position N at the point of time $T_{B1}$. During the time period from the point of time $T_{B1}$ to the point of time $T_{B2}$, the engine speed $N_E$ and second electric motor speed $N_{M2}$ are reduced as a result of the reduction of the engine torque $T_E$ and second electric motor torque $T_{M2}$ in step SB4 at the point of time $T_{B1}$.

At the point of time $T_{B2}$, step SB5 is implemented to move the spool of the manual valve to the neutral position N according to the operation of the shift lever 52, so that the power transmitting path indicated above is switched from the power transmitting state to the power cut-off, whereby a load which has acted in a direction that reduces a rise of the second electric motor speed $N_{M2}$ more longer acts on the second electric motor M2. Accordingly, the second electric motor speed $N_{M2}$ is raised at the point of time $T_{B2}$. Although the second electric motor speed $N_{M2}$ is raised at the point of time $T_{B2}$, the raised second electric motor speed $N_{M2}$ will not fall in the high-speed range, since the second electric motor speed NM2 is reduced during the time period from the point of time $T_{B1}$ to the point of time $T_{B2}$ as a result of reduction of the engine torque $T_E$ and second electric motor torque $T_{M2}$ at the point of time $T_{B1}$ The vehicular control apparatus in the form of the electronic control device 110 according to the present second embodiment has the following advantages (B1) through (B4), in addition to the advantage (A4) described above with respect to the first embodiment:

(B1) If the estimated second electric motor speed $N_{M2}$ after the power transmitting path through the automatic transmission portion 20 is switched to the power cut-off state with the releasing actions of the relevant ones of the clutches C and brakes B according to the table of FIG. 2 as a result of the operation of the shift lever 52 is in the predetermined high-speed range, the switching operation to switch the power transmitting path between the engine 8 and the drive wheels 34 from the power transmitting state to the power cut-off state is restricted, that is, delayed so that the risk of an excessive rise of the second electric motor speed $N_{M2}$ due to the switching of the power transmitting path can be reduced at an earlier point of time than when the switching operation is not restricted.

(B2) The switching operation of the power transmitting path is delayed when the absolute value of the operating speed $N_{M2}$ of the second electric motor M2 estimated by the speed estimating portion 114 is higher than the predetermined upper limit $LMT_{M2}$ and falls in the high-speed range, so that the risk of a rise of the operating speed of the second electric motor M beyond the upper limit can be reduced at an earlier point of time than when the switching operation is not restricted. Accordingly, the rise of the second electric motor speed N beyond the upper limit $LMT_{M2}$ can be reduced at an earlier point of time than when the switching operation is not delayed.

(B3) If the second electric motor speed $N_{M2}$ estimated by the speed estimating portion 114 falls in the high-speed range, the engine speed $N_E$ is reduced by the speed reducing portion 122, to reduce the second electric motor speed $N_{M2}$, so that the rise of the second electric motor speed $N_{M2}$ into the high-speed range due to the switching of the power transmitting path can be prevented.

(B4) When the switching operation determining portion 112 determines that the shift lever 52 is operated from the automatic forward-drive position D or manual forward-drive position M to the neutral position N during running of the vehicle, the second electric motor speed $N_{M2}$ after the automatic transmission portion 20 is shifted to switch the power transmitting path (between the second electric motor M2 and the drive wheels 34) from the power transmitting state to the power cut-off state as a result of the operation of the shift lever 52 is estimated. If the estimated second electric motor speed $N_{M2}$ is higher than the upper limit $LMT_{M2}$, the switching of the power transmitting path from the power transmitting state to the power cut-off state is delayed to adequately reduce or eliminate the risk of an excessive rise of the second electric motor speed Nm beyond the upper limit $LMT_{M2}$.

Third Embodiment

In the transmission mechanism 10, the second electric motor M2 is connected to one of two rotary members of the first clutch C1 (provided as a coupling element), so that the rotating speed of the rotary member of the first clutch C1 connected to the second electric motor M2, as well as the operating speed of the second electric motor M2, is rapidly raised when the power transmitting path through the automatic transmission portion 20 is brought into the power cut-off state as a result of the operation of the shift lever 52 from the drive position D, M to the neutral position. The rapid rise of the rotating speed of the rotary member of the first clutch C1 adversely influences the durability of the first clutch C1. In view of this drawback, an electronic control device 130 (shown in FIG. 4) according to the third embodiment of the present invention is configured to reduce or eliminate a risk of an excessive rise of the rotating speed of the above-indicated rotary member of the first clutch C1. Although the present third embodiment is arranged to reduce or eliminate the risk of the excessive rise of the rotating speed of the first clutch C1, the principle of the third embodiment is equally applicable to the other clutches C and the brakes B1 (other power coupling elements), and bearings and gears incorporated in the power transmitting path through the automatic transmission portion 20.

The electronic control device 130 provided in the third embodiment in place of the electronic control device 80 provided in the first embodiment includes the above-indicated switching operation determining portion 112, a speed estimating portion 134, a high-speed range determining portion 136, a switching portion 138, a switching restricting portion 140, and a speed reducing portion 142, which are also shown in the functional block diagram of FIG. 7. The function of the switching operation determining portion 112 has been described above with respect to the electronic control device 110 of the second embodiment.

When the switching operation determining portion 112 indicated in FIG. 7 has determined that the shift lever 52 is operated from the automatic forward-drive position D or manual forward-drive position M to the neutral position N, to switch the power transmitting path (between the engine 8 or first clutch C1 and the drive wheels 34) from the power transmitting state to the power cut-off state, the speed estimating portion 134 estimates the rotating speed $N_{C1}$ of the rotary member of the first clutch C1 (hereinafter referred to as "first clutch speed $N_{C1}$") which is established immediately after the power transmitting path through the automatic transmission portion 20 is cut off with the releasing actions of the relevant ones of the clutches C and brakes B according to the table of FIG. 2 as a result of the operation of the shift lever 52. For example, the speed estimating portion 134 can estimate the first clutch speed $N_{C1}$ on the basis of the present vehicle speed V and the present operation amount $A_{CC}$ of the accelerator pedal, and according to a predetermined relationship of the first clutch speed $N_{C1}$ with the vehicle speed V and operation amount $A_{CC}$, which relationship is obtained by experimentation conducted when the power transmitting path through the automatic transmission portion 20 is placed in the cut-off state. Thus, the speed estimating portion 134 functions as an operating-state estimating portion operable to estimate the operating state of the coupling element in the form of the first clutch C1.

When the speed estimating portion 134 has estimated the first clutch speed $N_{C1}$, the high-speed range determining portion 136 determines whether the estimated first clutch speed $N_{C1}$ is higher than a predetermined upper limit $LMT_{C1}$, that is, falls in a predetermined high-speed range. Since this determination is made to reduce or eliminate the risk of an excessive rise of the first clutch speed $N_{C1}$, irrespective of the direction of rotation of the rotary member of the first clutch C1, absolute values of the first clutch speed $N_{C1}$ and upper limit $LMT_{C1}$ are used to make this determination. The upper limit upper limit $LMT_{C1}$ is obtained by experimentation as a highest permissible speed $N_{C1}$ above which the durability of the first clutch C1 may be considerably deteriorated.

If the high-speed range determining portion 136 does not determine that the estimated first clutch peed $N_{C1}$ is in the predetermined high-speed range while the switching operation determining portion 112 determines that the shift lever 52 is operated to switch the power transmitting path from the power transmitting state to the power cut-off state, the switching portion 138 operates the above-described manual valve according to the operation of the shift lever 52, and controls the linear solenoid valves SL1-SL5 according to the table of FIG. 2, to switch the power transmitting path through the automatic transmission portion 20 from the power transmitting state to the power cut-off state. The switching portion 138 is further configured to inhibit the operations of the manual valve and linear solenoid valves SL1-SL5 for shifting the automatic transmission portion 20 to the cut-off state, when the switching portion 118 receives from the switching restricting portion 140 (described below) a command to restrict the switching operation to switch the power transmitting path from the power transmitting state to the power cut-off state.

If the high-speed range determining portion 136 determines that the estimated first clutch speed $N_{C1}$ is in the predetermined high-speed range while the switching operation determining portion 112 determines that the shift lever 52 is operated to switch the power transmitting path from the power transmitting state to the power cut-off state, the switching restricting portion 140 commands the switching portion 138 to restrict the switching operation to switch the power transmitting path from the power transmitting state to the power cut-off state, that is, to delay the switching operation. When a predetermined length of time has passed after the moment of generation of the restricting command, the switching restricting portion 140 cancels the restricting command, and commands the switching portion 138 to permit the shifting action of the automatic transmission portion 20. The predetermined length of time during which the shifting action of the automatic transmission portion 20 is inhibited is determined by experimentation while taking account of the durability of the first clutch C1. Although the present third embodiment is arranged such that the restricting command is cancelled when the predetermined length of time has passed, the restricting command may be cancelled when the engine speed $N_E$ has been lowered below a predetermined threshold.

If the high-speed range determining portion 136 determines that the estimated first clutch speed $N_{C1}$ is in the predetermined high-speed range while the switching operation determining portion 112 determines that the shift lever 52 is operated to switch the power transmitting path from the power transmitting state to the power cut-off state, the speed reducing portion 142 implements a control of the engine 8 so as to reduce its speed $N_E$, for instance, a fuel cut control of the engine 8, or reduces the opening angle $\theta_{TH}$ of the electronic throttle valve 62, for reducing the engine torque $T_E$ and speed $N_E$ for a predetermined length of time, and for preventing the engine speed $N_E$ from exceeding an upper limit, which is obtained by experimentation while taking account of the durability of the first clutch C1. The speed reducing portion 142 may be configured to implement a control to reduce the output torque $T_{M2}$ of the second electric motor M2, concurrently with the control to reduce the engine speed $N_E$, if the former control is effective to reduce or eliminate the risk of an excessive rise of the first clutch speed $M_{C1}$. The speed reducing portion 142 may be configured such that the amounts of reduction of the second electric motor torque $T_{M2}$, engine torque $T_E$ and speed $N_E$ increase with an increase of the present first clutch speed $N_{C1}$, or the above-indicated upper limit of the engine speed $N_E$ decreases with the increase of the first clutch speed $N_{C1}$.

Referring to the flow chart of FIG. 13, there will be described a control routine executed by the electronic control device 130 according to the third embodiment of the invention, for reducing an excessive rise of the rotating speed of the first clutch C1 as a result of an operation of the shift lever 52. This control routine is repeatedly executed with an extremely short cycle time of several milliseconds to several tens of milliseconds. It is noted that steps SC1, SC3, SC5, SC6 and SC7 of FIG. 13 respectively correspond to steps SB1, SB3, SB5, SB6 and SB7 of FIG. 11. Only a portion of the control routine of FIG. 13 which is different from that of FIG. 11 will be described.

If an affirmative determination is obtained in step SC1, that is, if the shift lever 52 is operated to switch the above-indicated power transmitting path (between the engine 8 or first clutch C1 and the drive wheels 34) from the transmitting state to the power cut-off state, the control flow goes to step SC2.

In step SC2 corresponding to the speed estimating portion 134 and high-speed range determining portion 136, the first clutch speed $N_{C1}$ after the power transmitting path through the automatic transmission portion 20 is placed in the cut-off state with the releasing actions of the relevant ones of the clutches C and brakes B according to the table of FIG. 2 as a result of the operation of the shift lever 52 is estimated, and the determination is made as to whether the estimated first clutch speed $N_{C1}$ is higher than the predetermined upper limit $LMT_{C1}$, and falls in the high-speed range. As indicated above, the absolute values of the first clutch speed $N_{C1}$ and upper limit $LMT_{C1}$ are used to make the determination. If an affirmative determination is obtained in SCB2, that is, if the estimated first clutch speed $N_{C1}$ falls within the high-speed range, the control flow goes to step SC3. If a negative determination is obtained in step SC2, the control flow goes to step SC6.

Step SC3 is followed by step SC4 corresponding to the speed reducing portion 142, the control to reduce the engine speed $N_E$ is implemented, by performing the fuel cut of the engine 8 or reducing the opening angle $\theta_{TH}$ of the electronic throttle valve 62, for example, to reduce the engine torque $T_E$ and engine speed $N_E$ for the predetermined length of time and for preventing the engine speed $N_E$ from exceeding the upper limit, which is obtained by experimentation while taking account of the durability of the first clutch C1. Step SC4 is followed by step SC5. The second electric motor torque $T_{M2}$ may be reduced concurrently with the control to reduce the engine speed $N_E$, if the reduction of the second electric motor torque $T_{M2}$ is effective to reduce or eliminate the risk of an excessive rise of the first clutch speed $N_{C1}$.

Figure 13:
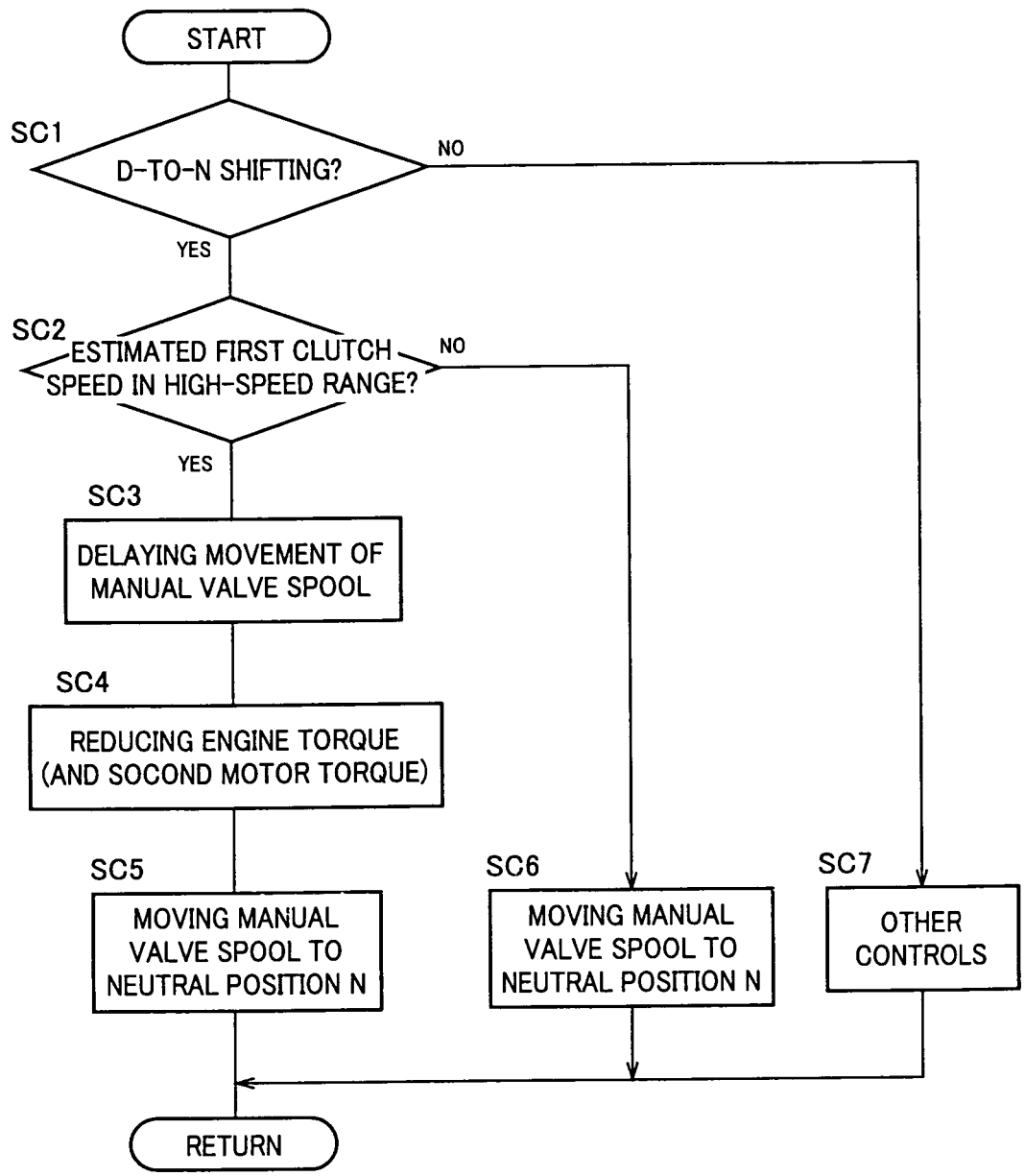
FIG. 13 is a flow chart illustrating a control routine executed by the electronic control device of FIG. 4 according to a third embodiment of the invention, for reducing an excessive rise of the rotating speed of a first clutch as a result of an operation of the shift lever.
Figure 14:
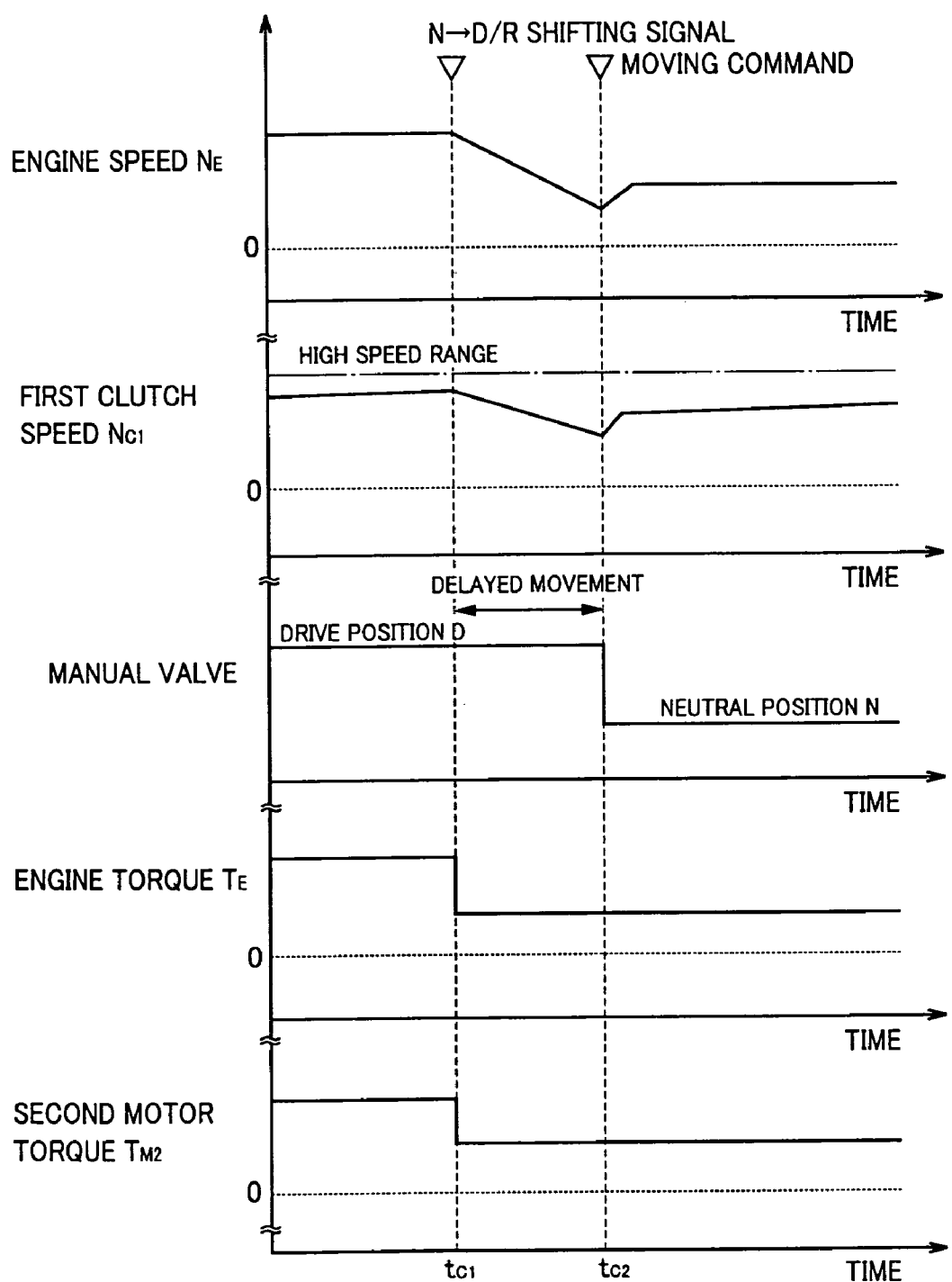
FIG. 14 is a time chart for explaining the control routine illustrated in the flow chart of FIG. 13, where the shift lever is operated from the forward-drive position D to the neutral position N, and the operation of the manual valve and the shifting action of the automatic transmission portion are delayed.

Reference is now made to the time chart of FIG. 14 for explaining the control routine illustrated in the flow chart of FIG. 13, where the shift lever 52 is operated from the automatic forward-drive position D to the neutral position N, and the shifting action of the automatic transmission portion 20 is delayed by restricting the operation of the manual valve and the operations of the linear solenoid valves SL-SL5.

At a point of time $T_{C1}$ indicated in FIG. 14, the shift lever 52 is operated from the forward-drive position D to the neutral position N. When the shift lever 52 is operated from the forward-drive position D to the neutral position N, the affirmative determination is obtained in step SC1 of the control routine of FIG. 13. In the specific example of FIG. 13, the first clutch speed $N_{C1}$ estimated in step SC2 is higher than the predetermined upper limit $LMT_{C1}$ and falls in the high-speed range, so that steps SC3 through SC5 are implemented. Described in detail, the movement of the spool of the manual valve from the forward-drive position D to the neutral position N is delayed up to a point of time $T_{C2}$, as a result of implementation of step SC3. If step SC3 was not implemented, the spool of the manual valve would be moved from the forward-drive position D to the neutral position N at the point of time $T_{C1}$. During the time period from the point of time $T_{C1}$ to the point of time $T_{C2}$, the engine speed $N_E$ and first clutch speed $N_{C1}$ are reduced as a result of the reduction of the engine torque $T_E$ and second electric motor torque $T_{M2}$ in step SC4 at the point of time $T_{C1}$.

At the point of time $T_{C2}$, step SC5 is implemented to move the spool of the manual valve to the neutral position N according to the operation of the shift lever 52, so that the power transmitting path through the automatic transmission portion 20 is switched from the power transmitting state to the power cut-off, whereby a load which has acted in a direction that reduces a rise of the rotating speed $N_{18}$ of the power transmitting member 18 to which the first clutch C1 is connected more longer acts on the power transmitting member 18. Accordingly, the first clutch speed $N_{C1}$ is raised at the point of time $T_{C2}$. Although the first clutch speed $N_{C1}$ is raised at the point of time $T_{C2}$, the raised first clutch speed $N_{C1}$ will not fall in the high-speed range, since the first clutch speed $N_{C1}$ is reduced during the time period from the point of time $T_{C1}$ to the point of time $T_{C2}$ as a result of reduction of the engine torque $T_E$ and the second electric motor torque $T_{M2}$ at the point of time $T_{C1}$.

The vehicular control apparatus in the form of the electronic control device 130 according to the present third embodiment has the following advantages (C1) through (C4), in addition to the advantage (A4) described above with respect to the first embodiment:

(C1) If the estimated first clutch speed $N_{C1}$ after the power transmitting path through the automatic transmission portion 20 is switched to the power cut-off state with the releasing actions of the relevant ones of the clutches C and brakes B according to the table of FIG. 2 as a result of the operation of the shift lever 52 is in the predetermined high-speed range, the switching operation to switch the power transmitting path between the engine 8 and the drive wheels 34 from the power transmitting state to the power cut-off state is restricted, that is, delayed so that the risk of an excessive rise of the first clutch speed $N_{C1}$ due to the switching of the power transmitting path can be reduced at an earlier point of time than when the switching operation is not restricted.

(C2) The switching operation of the power transmitting path is delayed when the absolute value of the rotating speed $N_{C1}$ of the above-indicated rotary member of the first clutch C1 estimated by the speed estimating portion 134 is higher than the predetermined upper limit $LMT_{C1}$ and falls in the high-speed range, so that the risk of a rise of the first clutch speed $N_{C1}$ beyond the upper limit can be reduced at an earlier point of time than when the switching operation is not restricted. Accordingly, the rise of the first clutch speed $N_{C1}$ beyond the upper limit $LMT_{C1}$ can be reduced at an earlier point of time than when the switching operation is not delayed.

(C3) If the first clutch speed $N_{C1}$ estimated by the speed estimating portion 134 falls in the high-speed range, the engine speed $N_E$ is reduced by the speed reducing portion 142, to reduce the first clutch speed $N_{C1}$, so that the rise of the first clutch speed $N_{C1}$ into the high-speed range due to the switching of the power transmitting path can be prevented.

(C4) When the switching operation determining portion 112 determines that the shift lever 52 is operated from the automatic forward-drive position D or manual forward-drive position M to the neutral position N during running of the vehicle, the first clutch speed $N_{C1}$ after the automatic transmission portion 20 is shifted to switch the power transmitting path (between the power transmitting member 18 connected to the first clutch C1, and the drive wheels 34) from the power transmitting state to the power cut-off state as a result of the operation of the shift lever 52 is estimated. If the estimated first clutch speed $N_{C1}$ is higher than the upper limit $LMT_{C1}$, the switching of the power transmitting path from the power transmitting state to the power cut-off state is delayed to adequately reduce or eliminate the risk of an excessive rise of the first clutch speed $N_{C1}$ beyond the upper limit $LMT_{C1}$.

While the preferred embodiments of this invention have been described in detail by reference to the accompanying drawings, it is to be understood that the present invention may be otherwise embodied.

In the first embodiment, for example, the operating-state estimating portion in the form of the speed estimating portion 92 estimates the first electric motor speed $N_{M1}$, and the high-speed range determining portion 94 determines whether the estimated first electric motor speed $N_{M1}$ falls in the high-speed range higher than the predetermined upper limit $LMT_{M1}$. However, the first embodiment may be modified such that the operating-state estimating portion estimates the direction of rotation of the power transmitting member 18 where the clutches C and brakes B of the automatic transmission portion 20 are controlled according to the operation of the shift lever 52. In this case, the high-speed range determining portion 94 is replaced by a determining portion configured to determine whether the estimated direction of rotation of the power transmitting member 18 is reversed with respect to the present direction of rotation. This determination may be made on the basis of the present direction of running of the vehicle, and the position to which the shift lever 52 has been operated. If the determining portion determines that the estimated direction of rotation of the power transmitting member 18 is reversed with respect to the present direction of rotation, the switching restricting portion 98 commands the switching portion 96 to restrict the switching operation to switch the power transmitting path from the power cut-off state to the power transmitting state. In this case, too, the risk of an excessive rise of the first electric motor speed $N_{M1}$ can be effectively reduced.

In the first, second and third embodiments, the transmission mechanism 10 does not include a differential limiting device such as a clutch device, which is operable to limit the differential function of the power distributing mechanism 16. However, the differential portion 11 may include the differential limiting device which is operated in steps SA4, SB4 and SC4 of the control routines of FIGS. 9, 11 and 13, to limit the differential function of the power distributing mechanism 16, for reducing the risk of an excessive rise of the operating speeds of the first and second electric motors M1, M2 and the rotating speed of the rotary member of the first clutch C1. For instance, the differential limiting device consists of a differential limiting clutch operable to limit or inhibit relative rotation of selected two of the rotary elements RE1, RE2 and RE3 of the power distributing mechanism 16. The differential limiting clutch is configured to limit or inhibit the relative rotation when the clutch is placed in a fully engaged state or in a partially engaged state (partially slipping state), so that differential portion 11 (power distributing mechanism 16) is placed in a non-differential (or substantially non-differential) state in which the three rotary elements RE1-RE3 are rotated as a unit in the fully or partially engaged state of the differential limiting clutch, whereby the first electric motor M1, second electric motor M2 and first clutch C1 are rotated at the speed equal or substantially equal to the engine speed $N_E$. Thus, the differential limiting clutch placed in its fully or partially engaged state makes it possible to reduce or eliminate the risk of excessive rises of the operating speeds of the first and second electric motors M1, M2 and first clutch C1.

The control apparatus in the form of the electronic control device 110 according to the second embodiment, controls the transmission mechanism 10 which includes the differential mechanism in the form of the power distributing mechanism 16, and the first electric motor M1. However, the control apparatus of the second embodiment may control a hybrid vehicle power transmitting system which does not include the first electric motor M1 and power distributing mechanism 16 and which includes the engine 8, a clutch device, the second electric motor M2 and automatic transmission portion 20, which are arranged in this order and connected in series to each other. In this case, too, the control apparatus can reduce the risk of an excessive temporary rise of the operating speed $N_{M2}$ of the second electric motor M2 due to the engine torque $T_E$ when the power transmitting path between the second electric motor M2 and the drive wheels 34 is switched to the power cut-off state during running of the vehicle. Such hybrid vehicle power transmitting system may be controlled by the electronic control device 130 according to the third embodiment, since the first clutch C1 is connected to the second electric motor M2.

In the illustrated transmission mechanism 10, the second electric motor M2 is connected directly to the power transmitting member 18. However, the second electric motor M2 may be connected to any portion of the power transmitting path between the engine 8 or power transmitting member 18 and the drive wheels 34, either directly or indirectly through a suitable transmission device.

Although the differential portion 11 of the illustrated transmission mechanism 10 functions as an electrically controlled continuously variable transmission the gear ratio γ0 of which is continuously variable from the minimum value γ0$_{min}$ to the maximum value γ0$_{max}$, the differential portion 11 may be modified such that its speed ratio γ0 is not variable continuously, but is variable in steps by utilizing its differential function. The present invention is applicable to a hybrid vehicle drive system including the differential portion modified as described above.

In the power distributing mechanism 16 in the illustrated transmission mechanism 10, the carrier CA0 is fixed to the engine 8, and the sun gear S0 is fixed to the first electric motor M1 while the ring gear R0 is fixed to the power transmitting member 18. However, this arrangement is not essential. The engine 8, first electric motor M1 and power transmitting member 18 may be fixed to any other elements selected from the three elements CA0, S0 and R0 of the planetary gear set 24.

While the engine 8 is directly fixed to the input shaft 14 in the illustrated transmission mechanism 10, the engine 8 may be operatively connected to the input shaft 14 through any suitable member such as gears and a belt, and need not be disposed coaxially with the input shaft 14.

In the illustrated transmission mechanism 10, the first and second electric motors M1, M2 are disposed coaxially with the input shaft 14 such that the first electric motor M1 is connected to the sun gear S0 while the second electric motor M2 is connected to the power transmitting member 18. However, this arrangement is not essential. For instance, the first electric motor M1 may be operatively connected to the sun gear S0 through gears, a belt or a speed reduction device, while the second electric motor M2 may be connected to the power transmitting member 18.

The hydraulically operated frictional coupling devices such as the first and second clutches C1, C2 in the illustrated transmission mechanism 10 may be replaced by coupling devices of magnetic powder type, electromagnetic type and mechanical type, such as powder clutches, electromagnetic clutches, meshing-type dog clutches. Where the electromagnetic clutches are used, the switching valve devices incorporated in the hydraulic control unit 70 are replaced by a switching device for controlling electric control signals for selectively energizing and de-energizing solenoids of the electromagnetic clutches, for example.

In the illustrated embodiment, the automatic transmission portion 20 is connected in series to the differential portion 11 through the power transmitting member 18. However, the automatic transmission portion 20 may be disposed coaxially with a counter shaft disposed parallel to the input shaft 14. In this case, the differential portion 11 and the automatic transmission portion 20 are connected to each other through a suitable power transmitting member or members in the form of a pair of counter gears, or sprockets and a chain, such that a rotary motion can be transmitted between the differential portion 11 and the automatic transmission portion 20.

Further, the differential mechanism in the form of the power distributing mechanism 16 provided in the illustrated transmission mechanism 10 may be replaced by a differential gear device including a pinion rotated by the engine 8, and a pair of bevel gears which mesh with the pinion and which are operatively connected to the first electric motor M1 and the power transmitting member 18 (second electric motor M2).

While the power distributing mechanism 16 in the illustrated transmission mechanism 10 is constituted by one planetary gear set 24, it may be constituted by two or more planetary gear sets so that the power distributing mechanism 16 is operable as a transmission having three or more gear positions in the non-differential state (fixed-speed-ratio shifting state). The planetary gear sets are not limited to the single-pinion type, and may be of a double-pinion type. Where the power distributing mechanism 16 is constituted by two or more planetary gear sets, the engine 8, first and second electric motors M1, M2 and power transmitting member 18 are operatively connected to respective rotary elements of the planetary gear sets, and the power distributing mechanism 16 is switched between its step-variable and continuously-variable shifting states, by controlling the clutches C and brakes B connected to the respective rotary elements of the planetary gear sets.

While the engine 8 and the differential portion 11 are connected directly to each other in the illustrated transmission mechanism 10, they may be connected to each other indirectly through a clutch.

In the illustrated transmission mechanism 10, the differential portion 11 and the automatic transmission portion 20 are connected in series to each other. However, the control apparatus according to the present invention is equally applicable to a power transmitting system in which an electrically controlled differential portion and a step-variable transmission portion are not mechanically independent of each other, provided the power transmitting system as a whole has an electric differential function, and a shifting function different from the electric differential function. Further, the electrically controlled differential portion and the step-variable transmission portion may be suitably disposed in a desired order in the drive system. Namely, the automatic transmission portion 20 is required to constitute a part of the power transmitting path between the engine 8 and the drive wheels 34.

In the illustrated transmission mechanism 10, the second electric motor M2 is connected to the power transmitting member 18 which constitutes a part of the power transmitting path between the engine 8 and the drive wheels 34. However, the second electric motor M2 which is connected to the above-indicated power transmitting path (power transmitting member 18) may be connectable to the power distributing mechanism 16 through a clutch or any other coupling device, so that the differential state of the power distributing mechanism 16 can be controlled by controlling the operating state of the second electric motor M2 rather than the first electric motor M1.

In the illustrated transmission mechanism 10, the first electric motor M1 and the second rotary element RE2 are connected directly to each other, while the second electric motor M2 and the third rotary element RE3 are connected directly to each other. However, the transmission mechanism 10 may be modified such that the first electric motor M1 and the second rotary element RE2 are connected to each other through a clutch or any other coupling element or device, while the second electric motor M2 and the third rotary element RE3 are connected to each other through a clutch or any other coupling element or device.

In the illustrated transmission mechanism 10, the automatic transmission portion 20 is a transmission portion functioning as a step-variable automatic transmission. However, the automatic transmission portion 20 may be replaced by a continuously-variable transmission (CVT) or a manually transmission. Further, the control apparatus according to the principle of the present invention is equally applicable to a hybrid vehicle power transmitting system which does not include a transmission portion but includes a clutch or any other coupling device or power transmitting or cut-off device operable to switch the power transmitting path between the power transmitting state and the power cut-off state.

The control apparatus of the present invention may be modified to execute combinations of the control routines of FIGS. 9, 11 and 13 of the first, second and third embodiments, in a predetermined order.

What is claimed is:

1. A control apparatus for a hybrid vehicle power transmitting system including (a) an electrically controlled differential portion which has a differential mechanism and an electric motor operatively connected to the differential mechanism and a differential state of which is controllable by controlling an operating state of the electric motor, and (b) a switching portion which constitutes a part of a power transmitting path and which is operable to switch the power transmitting path between a power transmitting state and a power cut-off state, said control apparatus comprising:

an operating-state estimating portion configured to estimate the operating state of the electric motor after the power transmitting path is switched from the power cut-off state to the power transmitting state; and a switching restricting portion configured to restrict a switching operation to switch the power transmitting path from the power cut-off state to the power transmitting state, when the operating state of the electric motor estimated by the operating-state estimating portion is in a predetermined state.

2. The control apparatus according to claim 1, wherein the operating state of the electric motor includes an operating speed of the electric motor, and the switching restricting portion restricts the switching operation when an absolute value of the operating speed of the electric motor is higher than a predetermined upper limit.

3. The control apparatus according to claim 1, further comprising a speed reducing portion configured to reduce an operating speed of the electric motor when the operating state of the electric motor estimated by the operating-state estimating portion is in the predetermined state.

4. The control apparatus according to claim 1, wherein the electrically controlled differential portion includes an output shaft from which an output of the differential portion is transmitted to a drive wheel of a hybrid vehicle provided with the vehicular power transmitting system, and the switching restricting portion is operated to restrict the switching operation when it is estimated that a direction of rotation of the output shaft is reversed when the power transmitting path is switched from the power cut-off state to the power transmitting state.

5. The control apparatus according to claim 1, wherein the electrically controlled differential portion is operable as a continuously-variable transmission mechanism while the operating state of the electric motor is controlled.

6. The control apparatus according to claim 1, wherein the vehicular power transmitting system includes a hydraulic switching valve operable to cut off a hydraulic pressure to switch the power transmitting path in response to an operation of a shift lever by an operator of a hybrid vehicle provided with the vehicular power transmitting system, and the switching restricting portion is configured to restrict an operation of the hydraulic switching valve in response to the operation of the shift lever.

7. The control apparatus according to claim 1, wherein the vehicular power transmitting system is provided to transmit an output of an internal combustion engine to a drive wheel of a hybrid vehicle provided with the vehicular power transmitting system, and the switching restricting portion is configured to reduce an operating speed and an output torque of the internal combustion engine, for reducing a rise of the operating speed of the electric motor.

8. The control apparatus according to claim 1, wherein the electrically controlled differential portion includes a differential limiting device operable to limit a differential function of the differential mechanism, and the switching restricting portion is configured to reduce a rise of the operating speed of the electric motor, by commanding the differential limiting device to limit the differential function of the differential mechanism.

9. A control apparatus for a hybrid vehicle power transmitting system including (a) a switching portion which constitutes a part of a power transmitting path between a drive power source and drive wheels of a hybrid vehicle and which is operable to switch the power transmitting path between a power transmitting state and a power cut-off state, and (b) an electric motor operatively connected to the power transmitting path, said control apparatus comprising:

an operating-state estimating portion configured to estimate an operating state of the electric motor after the power transmitting path is switched from the power transmitting state to the power cut-off state; and a switching restricting portion configured to restrict a switching operation to switch the power transmitting path from the power transmitting state to the power cut-off state, when the operating state of the electric motor estimated by the operating-state estimating portion is in a predetermined state.

10. The control apparatus according to claim 9, wherein the operating state of the electric motor includes an operating speed of the electric motor, and the switching restricting portion restricts the switching operation when an absolute value of the operating speed of the electric motor is higher than a predetermined upper limit.

11. The control apparatus according to claim 9, further comprising a speed reducing portion configured to reduce an operating speed of the electric motor when the operating state of the electric motor estimated by the operating-state estimating portion is in the predetermined state.

12. The control apparatus according to claim 9, wherein the hybrid vehicle power transmitting system further includes (c) an electrically controlled differential portion which has a differential mechanism and another electric motor operatively connected to the differential mechanism and a differential state of which is controllable by controlling the operating state of said another electric motor.

13. The control apparatus according to claim 12, wherein the electrically controlled differential portion is operable as a continuously-variable transmission mechanism while the operating state of the electric motor is controlled.

14. The control apparatus according to claim 12, wherein the electrically controlled differential portion includes a differential limiting device operable to limit a differential function of the differential mechanism, and the switching restricting portion is configured to reduce a rise of the operating speed of the electric motor, by commanding the differential limiting device to limit the differential function of the differential mechanism.

15. The control apparatus according to claim 9, wherein the vehicular power transmitting system includes a hydraulic switching valve operable to cut off a hydraulic pressure to switch the power transmitting path in response to an operation of a shift lever by an operator of a hybrid vehicle provided with the vehicular power transmitting system, and the switching restricting portion is configured to restrict an operation of the hydraulic switching valve in response to the operation of the shift lever.

16. The control apparatus according to claim 9, wherein the vehicular power transmitting system is provided to transmit an output of an internal combustion engine provided as the drive power source to the drive wheels, and the switching restricting portion is configured to reduce an operating speed and an output torque of the internal combustion engine, for reducing a rise of the operating speed of the electric motor.

17. A control apparatus for a hybrid vehicle power transmitting system including (a) an electrically controlled differential portion which has a differential mechanism and an electric motor operatively connected to the differential mechanism and a differential state of which is controllable by controlling an operating state of the electric motor, and (b) a switching portion which constitutes a part of a power transmitting path and includes a coupling element operable to switch the power transmitting path between a power transmitting state and a power cut-off state, said control apparatus comprising:
- an operating-state estimating portion configured to estimate the operating state of the coupling element after the power transmitting path is switched from the power transmitting state to the power cut-off state; and
- a switching restricting portion configured to restrict a switching operation to switch the power transmitting path from the power transmitting state to the power cut-off state, when the operating state of the coupling element estimated by the operating-state estimating portion is in a predetermined state.

18. The control apparatus according to claim 17, wherein the operating state of the coupling element includes a rotating speed of the coupling element, and the switching restricting portion restricts the switching operation when an absolute value of the rotating speed of the coupling element is higher than a predetermined upper limit.

19. The control apparatus according to claim 17, further comprising a speed reducing portion configured to reduce a rotating speed of the coupling element when the operating state of the coupling element estimated by the operating-state estimating portion is in the predetermined state.

20. The control apparatus according to claim 17, wherein the electrically controlled differential portion is operable as a continuously-variable transmission mechanism while the operating state of the electric motor is controlled.

21. The control apparatus according to claim 17, wherein the vehicular power transmitting system includes a hydraulic switching valve operable to cut off a hydraulic pressure to switch the power transmitting path in response to an operation of a shift lever by an operator of a hybrid vehicle provided with the vehicular power transmitting system, and the switching restricting portion is configured to restrict an operation of the hydraulic switching valve in response to the operation of the shift lever.

22. The control apparatus according to claim 17, wherein the vehicular power transmitting system is provided to transmit an output of an internal combustion engine to a drive wheel of a hybrid vehicle provided with the vehicular power transmitting system, and the switching restricting portion is configured to reduce an operating speed and an output torque of the internal combustion engine, for reducing a rise of a rotating speed of the coupling element.

23. The control apparatus according to claim 17 wherein the electrically controlled differential portion includes a differential limiting device operable to limit a differential function of the differential mechanism, and the switching restricting portion is configured to reduce a rise of a rotating speed of the coupling element, by commanding the differential limiting device to limit the differential function of the differential mechanism.

* * * * *